United States Patent [19]

Keller et al.

[11] 4,422,150
[45] Dec. 20, 1983

[54] MACHINE TOOL CONTROLLER AND PART INSPECTION MONITOR

[75] Inventors: Bruce E. Keller, Federal Way; Robert B. Andrews, Jr.; Charles F. Wylie, both of Puyallup; Kenneth W. Brinkerhoff, Bellevue, all of Wash.

[73] Assignee: The Boeing Company, Seattle, Wash.

[21] Appl. No.: 391,608

[22] Filed: Jun. 24, 1982

Related U.S. Application Data

[63] Continuation of Ser. No. 152,665, May 23, 1980, abandoned.

[51] Int. Cl.³ .............................................. G06F 15/46
[52] U.S. Cl. .................................. 364/475; 318/572; 364/171; 364/174; 364/553
[58] Field of Search ........ 364/474, 475, 553, 167–171, 364/550, 551, 560; 318/561, 572, 570; 408/3, 8–13; 409/79, 80

[56] References Cited

U.S. PATENT DOCUMENTS

| | | | |
|---|---|---|---|
| 3,045,510 | 7/1962 | Brainard | 409/79 |
| 3,063,311 | 11/1962 | Beckwith et al. | 409/79 |
| 3,125,796 | 3/1964 | Brainard | 29/26 |
| 3,349,229 | 10/1967 | Evans | 364/474 |
| 3,548,172 | 12/1970 | Centner et al. | 364/474 |
| 3,634,664 | 1/1972 | Valek | 364/474 |
| 3,665,493 | 5/1972 | Glowzewski | 364/475 |
| 3,739,158 | 6/1973 | Woodward | 364/474 |
| 3,809,488 | 5/1974 | Sonderegger | 408/6 |
| 3,817,647 | 6/1974 | Lemelson | 408/8 |
| 3,818,334 | 6/1974 | Rosenberg | 318/646 |
| 3,827,333 | 8/1974 | Hurd | 318/632 |
| 3,866,027 | 2/1975 | Cutler et al. | 364/474 |
| 3,875,382 | 4/1975 | Cutler | 364/474 X |
| 3,963,364 | 6/1976 | Lemelson | 408/8 |
| 4,038,890 | 8/1977 | Winget | 364/474 X |
| 4,078,195 | 3/1978 | Mathias et al. | 318/561 |
| 4,079,235 | 3/1978 | Froyd et al. | 364/474 X |
| 4,118,776 | 10/1978 | Isomura | 364/474 |
| 4,162,527 | 7/1979 | Kilbane | 364/474 |
| 4,176,396 | 11/1979 | Howatt | 364/474 X |

FOREIGN PATENT DOCUMENTS 12620 6/1980 European Pat. Off. ............ 364/474

Primary Examiner—Joseph F. Ruggiero
Attorney, Agent, or Firm—Christensen, O'Connor, Johnson & Kindness

[57] ABSTRACT

A machine tool controller and part inspection monitor that controls part cutting by a machine tool (21) and provides a readout of cutter deviation beyond a preset tolerance is disclosed. Axis position sensors (23) continuously sense the position of the part (if the part is moved), the position of the cutter (if the cutter is moved) or the position of the part and the cutter (if both are moved) along various control axes. A data processor (31) uses the sensed axis position data to continuously determine the transfer function of the machine tool (21). The data processor (31) combines the transfer function information with data that defines the centerline of the cut to produce control signals suitable for controlling part and/or cutter movement. The location and amount of deviation from the defined centerline greater than the allowable tolerance are recorded and read out.

13 Claims, 26 Drawing Figures

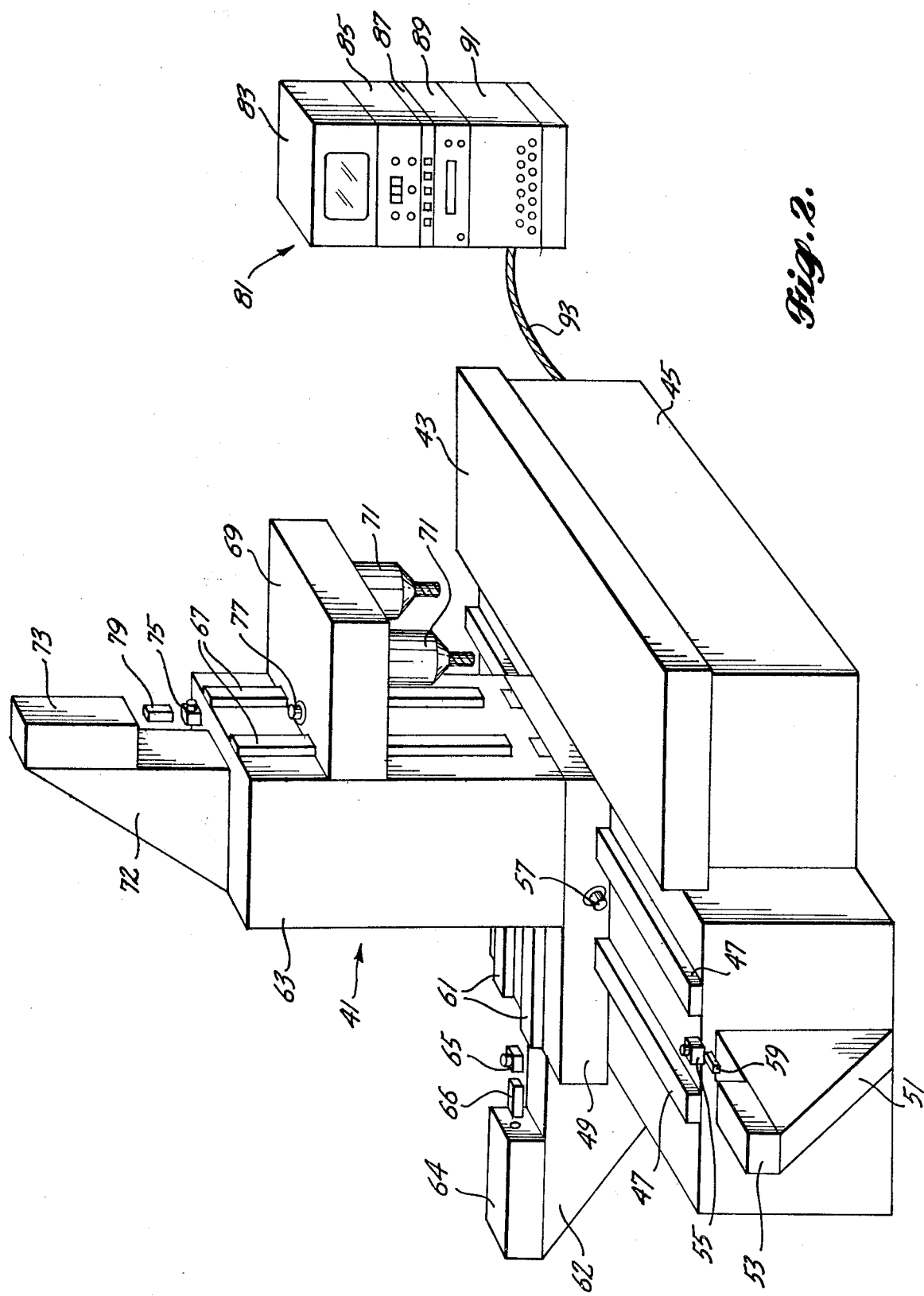

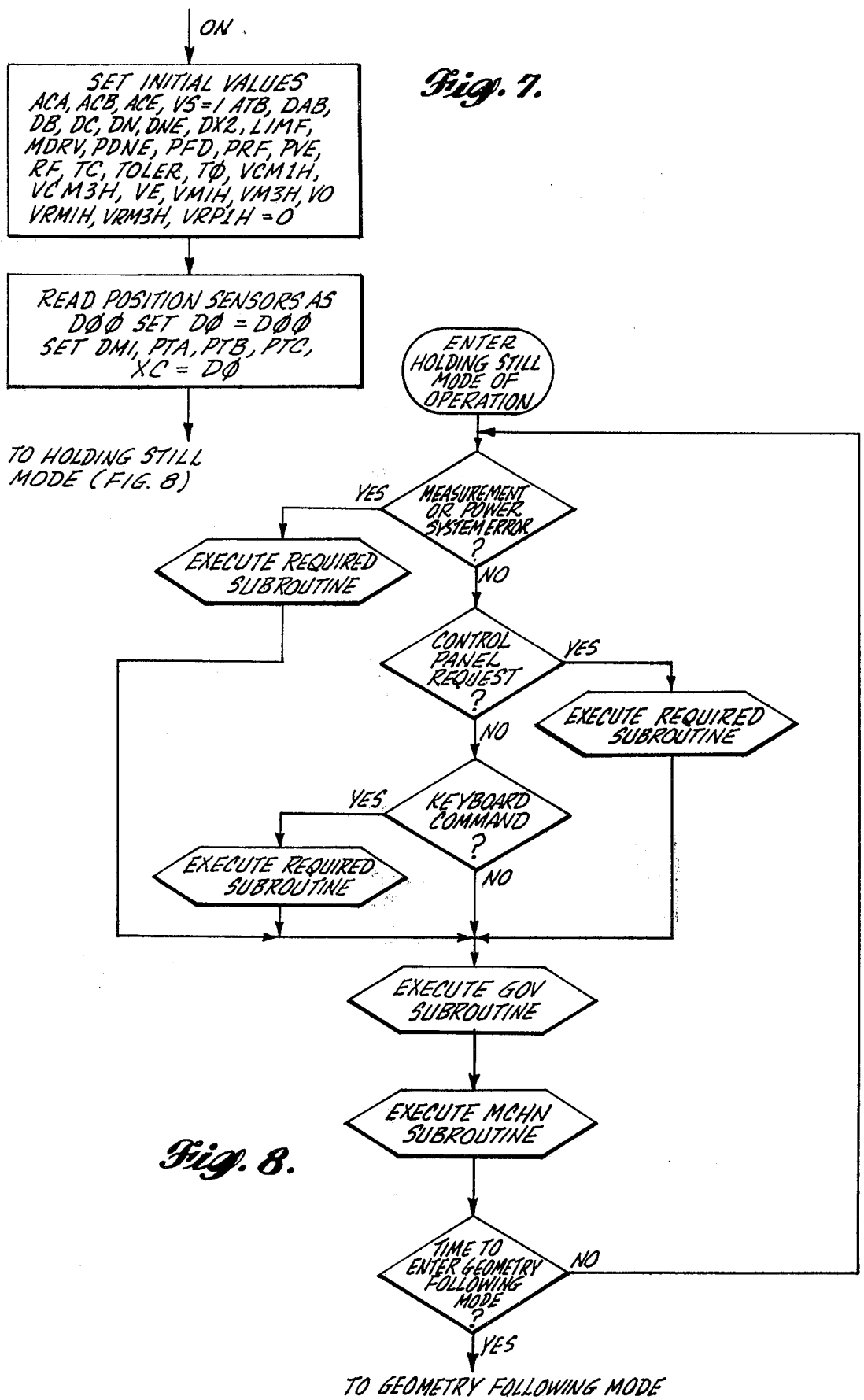

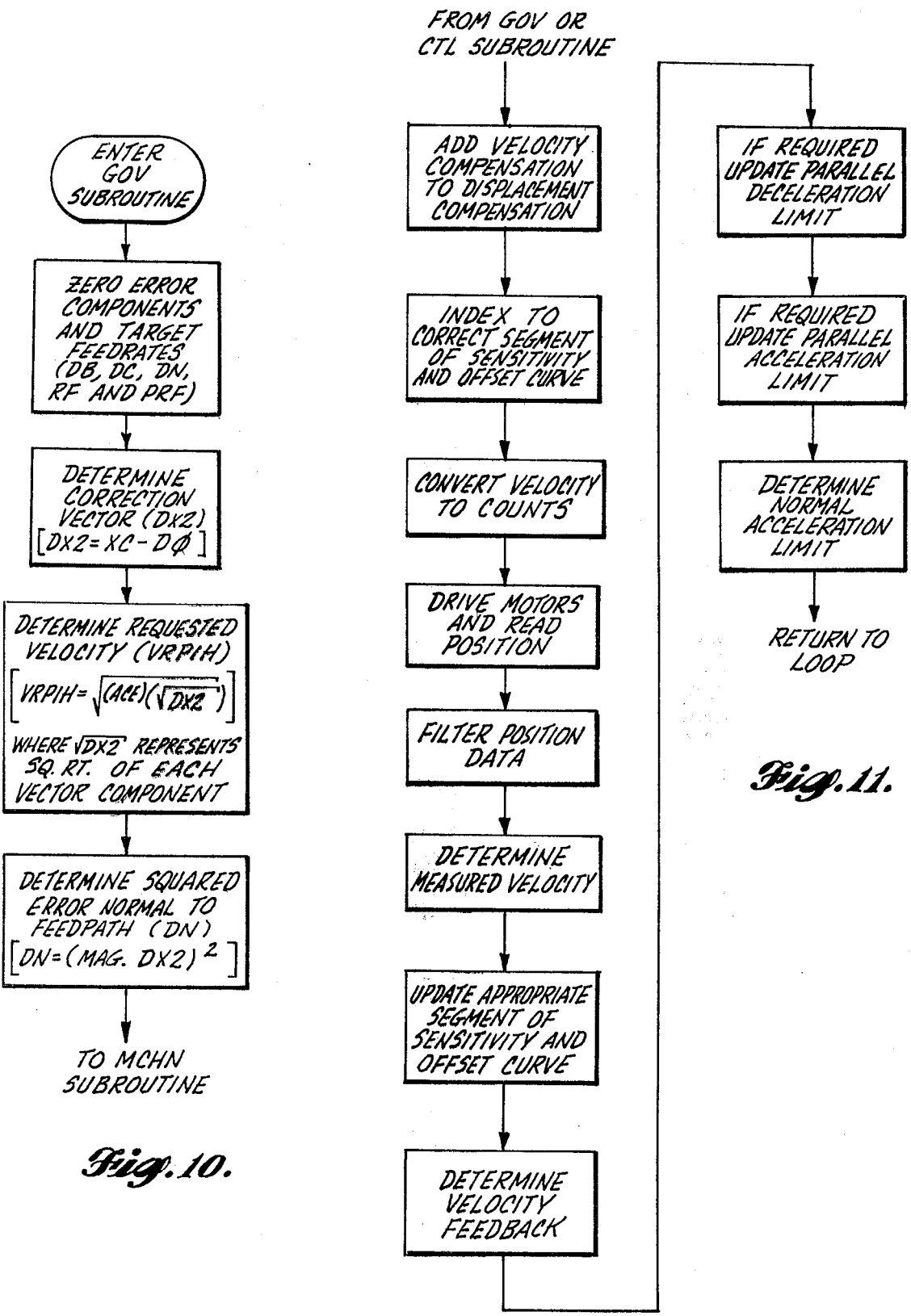

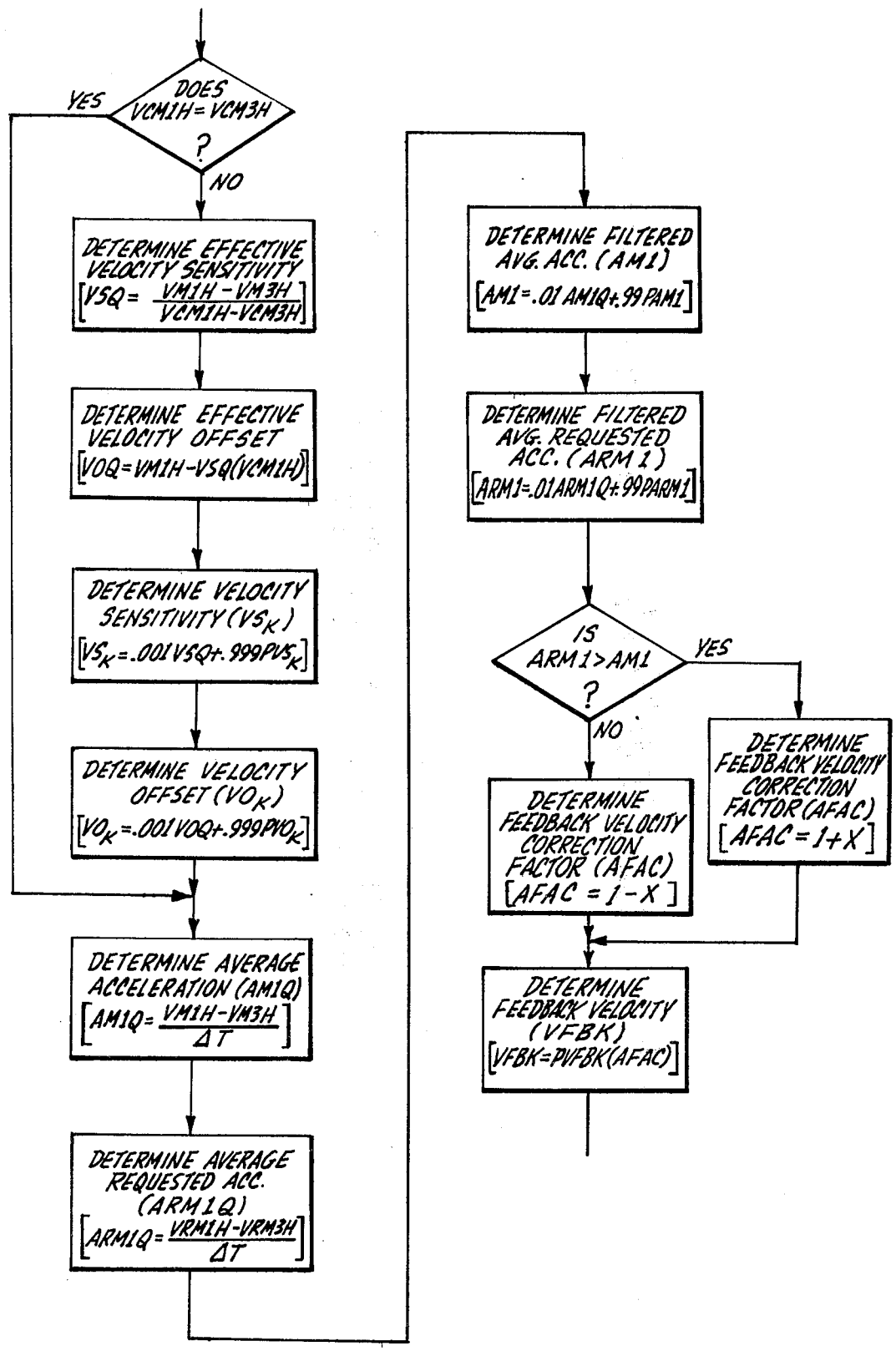

MACHINE TOOL CONTROLLER AND PART INSPECTION MONITOR

This is a continuation of the prior application Ser. No. 152,665, filed May 23, 1980, abandoned, the benefit of the filing dates of which are hereby claimed under 35 USC 120.

TECHNICAL FIELD

This invention is directed to machine tools and, more particularly, to numerically controlled (N/C) machine tools.

BACKGROUND OF THE INVENTION

Many prior art systems for numerically controlling machine tools have been proposed. Some of these systems have been built and are presently being used to control various types of machine tools. In general, the more modern prior art machine tool control systems, regardless of whether or not they have been built and used, include feedback servo loops for controlling the position of cutters and/or parts, depending upon whether the cutter, part or both are to be moved during the machining (e.g., cutting) operation. Normally, a feedback servo control loop is provided for each controlled axis of movement. The feedback servo loops compare program position signals for the relevant axis with the sensed position of the machine tool along that axis. Any deviation therebetween creates an error signal that is used to control movement of the part or cutter along the axis in the direction that reduces the error signal to zero. In some prior art systems, the rate of movement along the relevant axis is controlled or limited to minimize overshoot; and, thus, part cutting errors caused by overshoot.

While, as noted above, many prior art machine tool control systems have been built and are in use, such systems have a number of disadvantages. Ideally, the part and/or cutter movement mechanisms of a machine tool will function exactly as designed. However, because these components are mechanical, such a result does not occur. More specifically, because the mechanisms for moving cutters and/or parts are mechanical, even when new, they deviate to some degree from their design parameters. Similarly, servo and other mechanical control mechanisms do not function exactly in accordance with their design parameters, even when new. And, of course, as a machine tool is used its parts wear, whereby the operation of the mechanical mechanisms of the machine change. Servo control loops and part movement mechanisms, e.g., electrical and hydraulic systems for moving cutters and/or parts also change with time as a result of part wear and deterioration. In other words, even when new, the transfer function of machine tool elements if not ideal. That is, the response of the machine tool elements to an input stimuli (i.e., the transfer function) is not ideal. Moreover, the transfer function changes with machine use. The transfer function also changes each time a machine tool element is repaired, adjusted or replaced. The end result of transfer function changes have been twofold. First, machine tools have been relatively frequently adjusted to reduce the effects of wear. Secondly, parts produced by numerically controlled machines have been inspected to determine whether or not they fall within allowable tolerances. Such post process inspection is very costly and time consuming, particularly when the part must meet stringent tolerance requirements.

Therefore, it is an object of this invention to provide a new and improved machine tool controller.

It is another object of this invention to provide a machine tool controller and part inspection monitor suitable for controlling a machine tool and providing a readout indicating when the shape and/or size of an actual part deviates from the shape and/or size of the desired part.

It is a still further object of this invention to provide a machine tool controller that continuously determines the transfer function of a machine tool and uses the transfer function information in a manner that automatically compensates for machine tool wear so as to substantially reduce the need to frequently adjust the machine tool or replace parts thereof to compensate for such wear.

It is yet a further object of this invention to provide a machine tool controller that continuously determines the transfer function of a machine tool and uses the transfer function information in a manner that optimizes the cutting speed of the machine tool while maintaining the cutting path within a preset tolerance of the centerline of the desired cutting path.

SUMMARY OF THE INVENTION

In accordance with this invention, a machine tool controller and part inspection monitor is provided. The machine tool controller and part inspection monitor controls machining (e.g., cutting) by a machine tool and, preferably, provides a readout of cutter deviations from a prescribed centerline that lies outside of a preset tolerance. More specifically, in accordance with the invention, axis position sensors continuously sense the relative positions of a part and a cutter along controlled axes. That is, if the part moves along a particular axis, the position of the part along that axis is sensed. Contrariwise, if the cutter moves along a particular axis, the position of the cutter along that axis is sensed. If both the part and the cutter move, movement of both items is sensed along their individual axes of movement. A data processor uses the sensed axis position data to continuously determine the transfer function of the machine tool. The data processor combines the transfer function information with data that defines the centerline of the cut to produce axis control signals suitable for controlling part and/or cutter movement. The location and amount of deviations from the defined cutting centerline, greater than an allowable tolerance, are recorded and may be automatically read out.

In accordance with a preferred embodiment of the invention, the centerline cut data is in a form of a series of vectors, each of which defines a segment of the overall cutting path of travel of the cutter. First, the cutter (or part) is moved to an initial position along the various axes of movement. This position is defined as the start (0, 0) position. At the same time or shortly thereafter, a power-up mode of operation is entered, during which a variety of factors (utilized by the data processor during other modes of operation of the invention to determine the transfer function of the machine and develop the axis control signals) are set to initial values. After the power-up initialization mode of operation is completed, the machine tool controller shifts to a holding still mode of operation. When in the holding still mode of operation, the machine tool controller determines if: any measurement of power system errors exist; any request switches on a control panel have been actuated; and/or any keyboard commands have been entered by the operator. If any such errors, requests or commands are present appropriate subroutines are executed. If no such errors, requests or commands are present, the holding still mode of operation enters subroutines during which the position of the part and/or cutter with respect to the start (0,0) position is continuously sensed. The sensed information is used to determine the transfer function of the machine tool. The transfer function information is combined with start position information to produce axis control signals that control the application of power to the axis position control mechanisms. As long as the machine tool controller is in the holding still mode of operation (or each time it is shifted to the holding still mode of operation) the steps are continuously repeated. That is, the transfer function is continuously determined and combined with start position data to produce axis control signals. The axis control signals maintain the part and/or cutter at the start (or restart) position.

When the part is to be cut, the data processor enters a geometry following mode of operation. In this mode of operation, the position of the part or the cutter with respect to each centerline vector is continuously determined as that vector is being followed. More specifically, repetitive position determinations at, preferably, fixed time intervals are made as a particular vector cut is being made. Anywhere from a few to several hundred or more determinations may be made for each vector, depending upon the length of the vector and the desired accuracy. During each determination cycle, the transfer function of the machine is also determined. If the cutter is not on the cutting centerline during any determination cycle, the part (or the cutter) is moved toward the centerline. More specifically, the axis position control signals that cause movement of the part (or the cutter) are produced using the then existing machine transfer function information and the centerline cutting data. Any time the error between the cutter position and the centerline is greater than the acceptable tolerance, information about the position and amount of the tolerance deviation is stored in a memory. In this way part inspection information is automatically provided.

In accordance with further aspects of this invention, the valve of the angle between the present and the next succeeding vector is used to limit feed (cutting) rate such that the required angular change can be made without an out of tolerance overshoot occuring.

As will be appreciated from the foregoing description, the invention provides a new and improved machine tool controller. The improved controller controls a machine tool (e.g., a milling machine) such that wear adjustments are minimized. This result is accomplished by continuously determining the transfer function of the machine tool and using this information to control the production of control signals. In addition, because out of tolerance errors are automatically detected and stored in memory, the invention also reduces or eliminates post processing inspection requirements. As a result of these advantages, the per unit cost of parts formed on a machine tool controlled by an apparatus formed in accordance with the invention is substantially less than the per unit cost of parts manufactured by machine tools controlled by prior art machine tool controllers.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 2 is a pictorial diagram of a milling machine suitable for control by a machine tool controller formed in accordance with the invention;

FIG. 7 is a flow diagram illustrating the power-up utilization mode of operation illustrated in FIG. 6;

FIG. 8 is a flow diagram illustrating the holding still mode of operation illustrated in FIG. 6;

FIG. 10 is a flow diagram of a GOV subroutine that can be entered either during the holding still mode of operation of the invention or certain subroutines;

FIG. 11 is a summary flow diagram of the MCHN subroutine that can be entered during various modes of operation and subroutines;

FIGS. 13A-E comprise a detailed flow diagram of the MCHN subroutine summarized in FIG. 11;

DESCRIPTION OF THE PREFERRED EMBODIMENT

Figure 1:
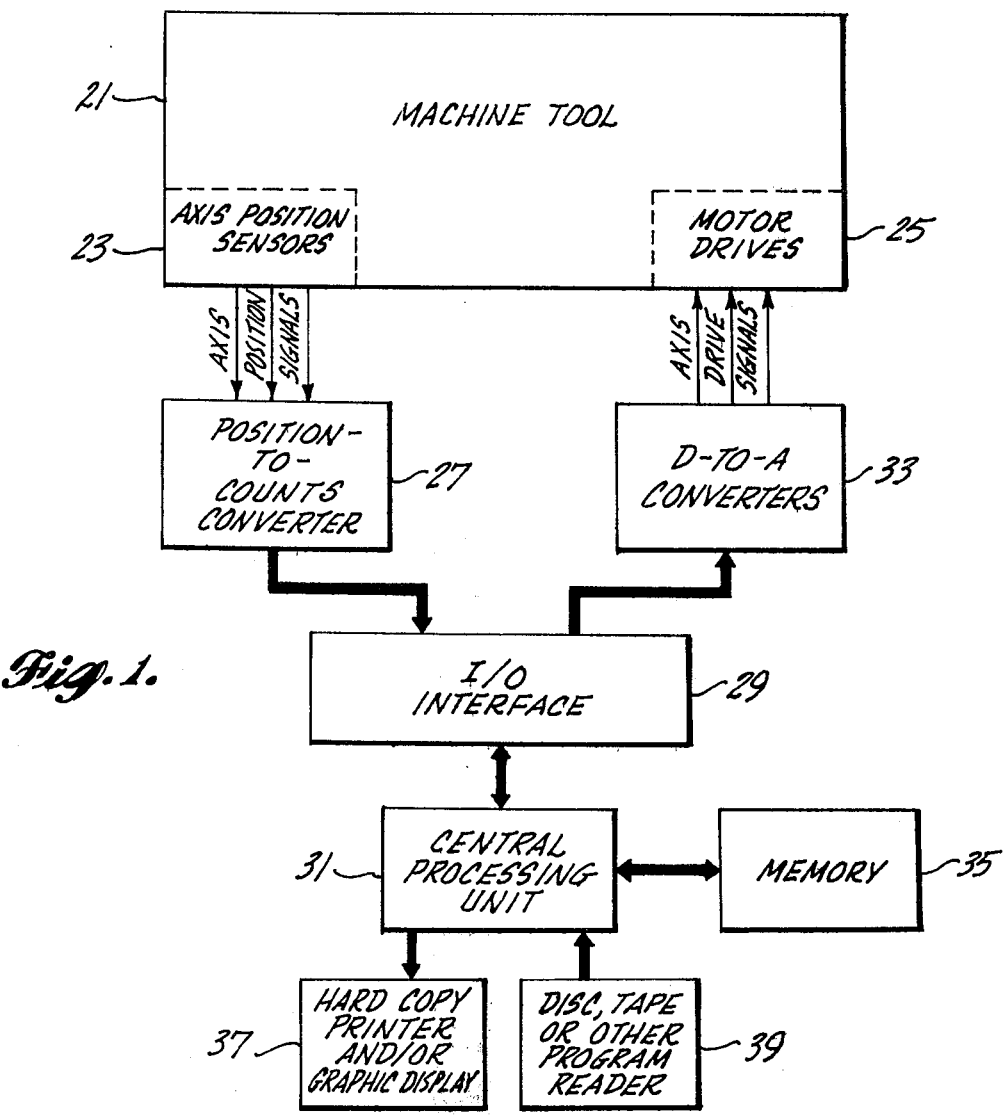
FIG. 1 is a block diagram of a machine tool controller formed in accordance with the invention.

FIG. 1 is a block diagram of a machine tool control system formed in accordance with the invention. Illustrated in FIG. 1 is a machine tool 21, such as a milling machine of the type illustrated in FIG. 2 and hereinafter described. Mounted on the machine tool are a plurality of axis sensors 23. The axis sensors sense either the position of the part or the cutter of the machine tool, or both, depending upon whether the part, the cutter or both are moved along predetermined axes. The axes may be linear X-Y-Z axes or rotational axes. The machine tool 21 also includes motor drives 25 adpated to move the cutter and/or part along the sensed axes of movement. The motor drives may be electric, mechanical, pneumatic, hydraulic or a mixture thereof, depending upon the nature of the machine tool.

The axis position sensors 23 are connected to a position-to-counts converter 27 that converts the axis position signals produced or controlled by the axis position sensors into digital count signals. Various axis position sensors 23 can be utilized, depending upon the degree of accuracy desired. As hereinafter described, position sensors based on highly accurate laser interferometer techniques may be used for example. Alternatively, position sensors based on Hall effect, Moire' fringe or electromagnetic induction techniques may be used. One specific example of a laser position sensor found suitble for use in one actual embodiment of the invention is the Model 5501 Laser Transducer System manufactured by Hewlett Packard, Inc., Santa Clara, Ca.

Preferably, the position-to-counts converter 27 produces parallel digital signals whose value represents the axial position of the part and/or cutter along the various sensed axes. If desired, a separate converter can be provided for each sensor, or a single converter can be sequentially coupled to each sensor, or still other well known techniques can be used. Regardless of whether the digital signals are parallel or serial, or how they are formatted, the digital signals produced by the position-to-counts converter 27 are applied via an I/O interface 29 to a central processing unit 31. Control signals produced by the central processing unit 31 in the manner hereinafter described are applied through the I/O interface 29 to digital-to-analog (D-to-A) converters 33. The D-to-A converters convert the control signals from digital form into analog form and apply the analog control signals to the motor drives 25.

Connected to the central processing unit 31 is a memory 35 which includes a suitable number of conventional read only memories (ROMs) and/or random access memories (RAMs). Also connected to the central processing unit is a suitable output display device such as a hard copy printer or a graphic display device 37. Finally, connected to the central processing unit is a suitable program source, such as a disc, tape or other program reader 39 adapted to produce, among other data, data that defines the centerline of the path of travel to be followed by the cutter of the machine tool. As discussed below, the centerline defining data comprises a series of vectors.

FIG. 2 illustrates an example of a machine tool suitable for control by a machine tool controller formed in accordance with the invention. More specifically, FIG. 2 includes a simplified sketch of a milling machine 41, adapted to be controlled by a machine tool controller formed in accordance with the invention. The milling machine 41 includes a horizontal table 43 mounted atop a base 45. The base 45 is adapted to be mounted in a fixed position on the floor of a machine tool work area. The table 43 is horizontally elongate, i.e., it has a longitudinal dimension in a horizontal plane. Suitable part holding mechanisms or jigs (not shown) are used in a conventional manner to attach a part to be milled to the top of the table 43.

Horizontally mounted on a portion of the base 45 lying adjacent to the table 43 are a first pair of parallel ways 47, which lie parallel to the longitudinal dimension of the table 43. Mounted on the first pair of parallel ways 47 is a first carriage 49. The first carriage is horizontally movable back and forth along the first pair of parallel ways by any conventional movement mechanism, e.g., a motor drive, which is not illustrated in FIG. 2 since such movement mechanisms are well known.

Mounted on an arm 51 affixed to the base 45 is a first laser 53. The first laser 53 produces a coherent light beam that lies parallel to the longitudinal axis of the first pair of parallel ways 47. The coherent light beam passes through a suitably positioned first interferometer 55 and impinges on a first retroreflector 57, mounted on the first carriage 49 and positioned so as to be intersected by the coherent light beam. In a conventional manner the retroreflector 57 reflects the coherent light beam produced by the first laser 53 back to the first interferometer 55. Mounted between the first interferometer 55 and the laser 53 is a first receiver 59 that receives the output of the interferometer 55. In a conventional manner, the first laser, first interferometer, first retroreflector and first receiver cooperate together such that the first receiver 59 produces a signal denoting the position of the first carriage 49 along the first pair of parallel ways 47. Consequently, this subsystem forms a first axis position sensor. For a more detailed description of a laser interferometer system of this type attention is directed to descriptions of the Model 5501 Laser Transducer System manufactured by Hewlett Packard, Inc., Santa Clara, Ca.

Horizontally mounted atop the first carriage 49 is a second pair of parallel ways 61. The second pair of parallel ways 61 lie orthogonal to the first pair of parallel ways 47. Thus, the second pair of parallel ways 61 lie orthogonal to the longitudinal dimension of the table 43. Mounted on the second pair of parallel ways 61 is a second carriage 63. As with the first carriage 49, the second carriage 63 is moved back and forth along the second pair of parallel ways 61 by a conventional motor drive mechanism (not shown).

Mounted on an arm 62 attached to and projecting outwardly from the first carriage 49 is a second laser 64. The second laser 64 produces a coherent light beam that lies parallel to the longitudinal axis of the second pair of parallel ways 61. The coherent light beam produced by the second laser 64 passes through a second suitably positioned interferometer 65 and impinges on a second retroreflector. The second retroreflector is not viewable in FIG. 2; however, it is mounted on the second carriage 63 so as to intersect the light beam produced by the second laser 64 and reflect the light beam back to the second interferometer. Mounted between the second interferometer 65 and the second laser 64 is a second receiver 66 positioned to receive the output of the second interferometer 65. As with the first laser subsystem, the second laser subsystem, which comprises the second laser 64, the second interferometer 65, the second retroreflector and the second receiver 66 forms an axis position sensor. This second axis position sensor senses the position of the second carriage 63 along the second pair of parallel ways 61.

Vertically mounted on the side of the second carriage 63 facing the table 43 is a third pair of parallel ways 67. The third pair of parallel ways 67 lie orthogonal to the first and second pairs of parallel ways 47 and 61. Further, the third pair of parallel ways 67 lie along an axis that is essentially coplanar with the nearest edge of the table 43. Mounted on the third pair of parallel ways 67 is a third carriage 69. The third carriage 69 overlies the table 43 and supports on its lower surface, one or more milling machine powerheads 71. As with the first and second carriages, the third carriage 69 is vertically moved by a conventional motor drive mechanism (not shown).

Mounted on an arm 72 projecting upwardly from atop the second carriage 63 is a third laser 73. The third laser 73 produces a coherent light beam that lies parallel to the longitudinal axes of the third pair of parallel ways 67. Thus, the light beam is vertical. The coherent light beam produced by the third laser 73 passes through a suitably mounted third interferometer 75 and intersects a third retroreflector 77, mounted atop the third carriage 67. The third retroreflector reflects the light beam back to the third interferometer. Located between the third interferometer 75 and the third laser 73 is a third receiver 79. As it will be readily appreciated by those skilled in the laser art, the third laser system, which comprises the third laser 73, the third interferometer 75, the third retroreflector 77 and the third receiver 79, comprises a third position sensor adapted to sense the vertical position of the third carriage 69 along the third pair of parallel ways 65.

Also illustrated in FIG. 2 is a console 81 formed of a vertical stack of housings that house electronic systems which are connected together to perform the functions of the various electronic systems illustrated in block form in FIG. 1. In this regard, the stack of housings include: a graphic (CRT) display unit housing 83; an operator control panel housing 85 having a plurality of switches located on one face; a keyboard panel housing 87 having a keyboard located on one face; a floppy disc reader housing 89; and, a data processor housing 91, which includes a central processing unit and a memory, plus other I/O's and other necessary subsystems included in a data processor. The console 81 is connected to the axis position sensors and motor drives of the milling machine 41 by a connecting cable 93.

In a conventional manner, at start up, after the desired tool (cutter) is mounted in one of the powerheads 71 and the part to be milled is mounted on the table 43, the first, second and third carriages 49, 63 and 69 are moved along their respective ways until the tool is in a predetermined start position. The start or 0,0,0 position is normally determined by mounting a gage between the tip of the tool and a predetermined position on the part. After the 0,0,0 position has been defined for the machine tool controller of the invention, the machine tool controller functions in the manner hereinafter described to control the machine tool (e.g., the milling machine 41) as it machines (e.g., cuts) the part.

It is pointed out here that while the machine tool illustrated in FIG. 2 is adapted to move the cutter along two horizontal axes and a vertical axis, machine tools wherein the part and cutter are both movable can also be controlled by suitably formed embodiments of the invention. Or, the cutter can be held stationary and only the part moved. Moreover, as noted below, axial movement other than linear can be controlled.

Figure 3:
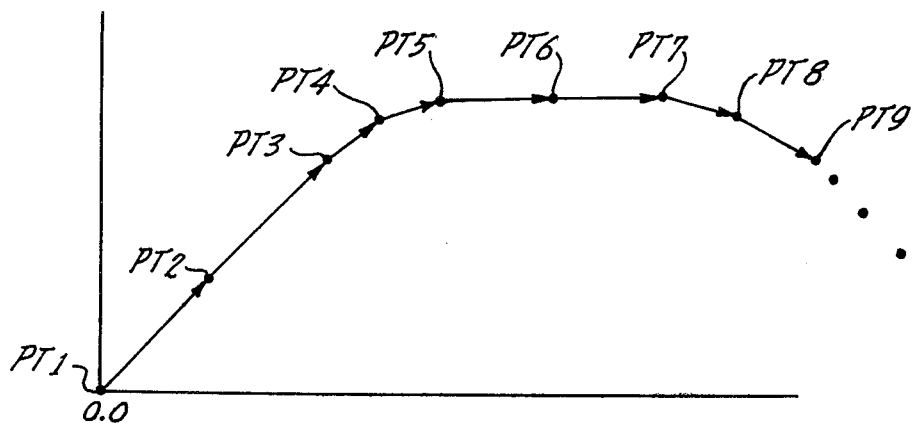
FIG. 3 is a simplified graph of a cutting centerline defined by a plurality of vectors.

The present invention defines the centerline of the cutting path to be followed by the cutter as a series of end-to-end connected vectors. In order to simplify the present description of the invention, the hereinafter described vectors are illustrated as lying in a single plane. However, it is to be understood that an actual embodiment of the invention may have up to six control axes—three linear and three rotational, or any portion thereof, if desired. Based on this understanding, FIG. 3 illustrates a series of vectors that define a centerline cutting path joining a plurality of points. The vectors start at the 0, 0 starting point denoted PT1 for point one (1). The first vector runs from PT1 to a second point designated PT2. The second vector runs from PT2 to a third point designated PT3, etc.

Figure 4:
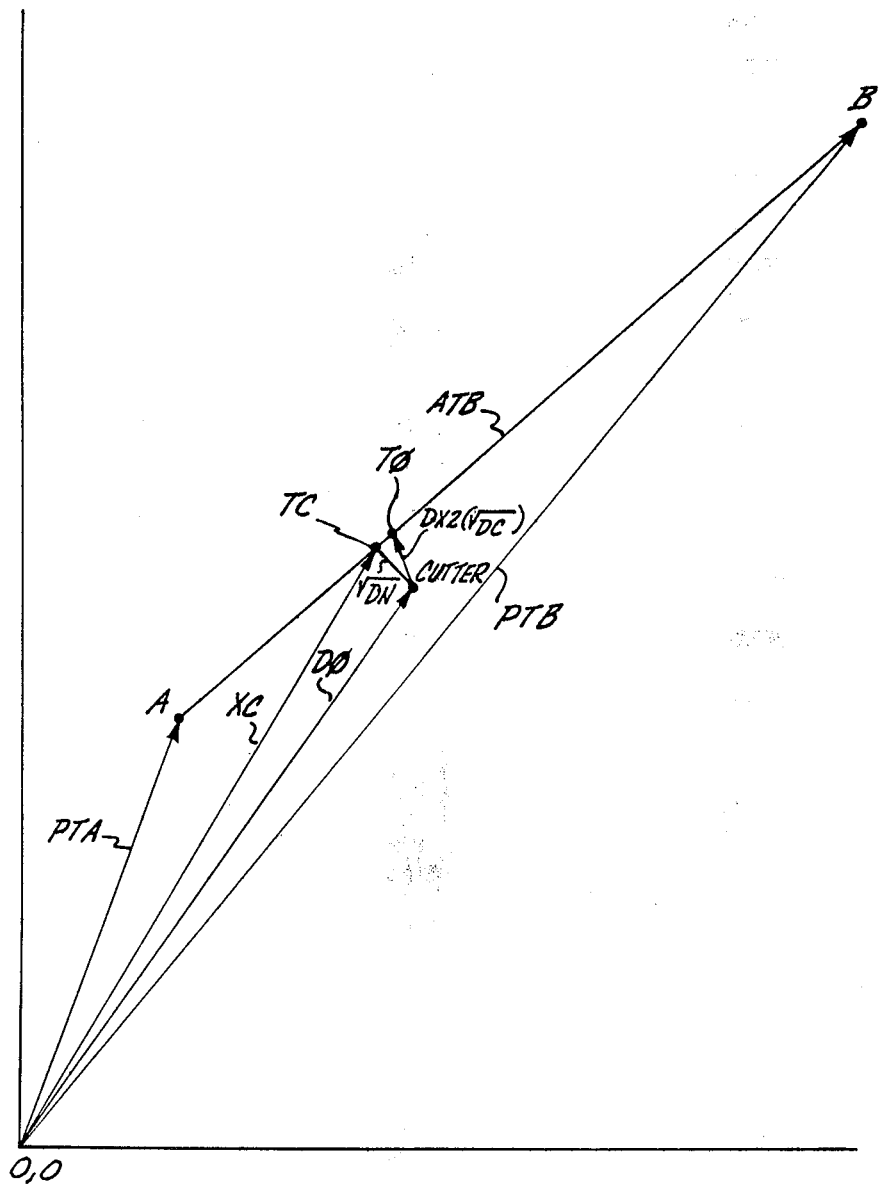
FIG. 4 is a graph illustrating a single centerline vector.

FIG. 4 illustrates a single vector running from a point designated A to a point designated B. Point A could be any one of PT1, PT2, PT3, etc., whereby point B is the next successive point. In any event, with respect to the starting or 0, 0 point, point A is defined by the vector PTA and point B is defined by the vector PTB. The vector from point A to point B is defined as the vector ATB.

FIG. 4 also illustrates an exemplary position of the cutter with respect to vector ATB. The position of the cutter is defined by the vector $D\emptyset$. FIG. 4 also illustrates other points, vectors and distances whose utilization will be better understood from the following description of the operation of a central processing unit adapted to function in accordance with the invention. For purposes of orientation and because these points, vectors and distances are shown in FIG. 4, they are briefly described here. First, FIG. 4 illustrates the point projection of the cutter (defined by the vector $D\emptyset$) on vector ATB. This point projection is denoted TC and its vector position with respect to the starting point (0, 0) is defined by the vector XC. By definition, the distance between TC and the cutter lies along a line that is perpendicular to vector ATB. This distance is denoted $\sqrt{DN}$. In addition, a point lying along vector ATB and denoted $T\emptyset$ is illustrated in FIG. 4. $T\emptyset$ defines the position at which the cutter should be at on centerline vector ATB when the actual cutter position (defined by vector $D\emptyset$) is determined. In other words $T\emptyset$ is the correct cutter position based on the control program and $D\emptyset$ is the actual cutter position.

Figure 5:
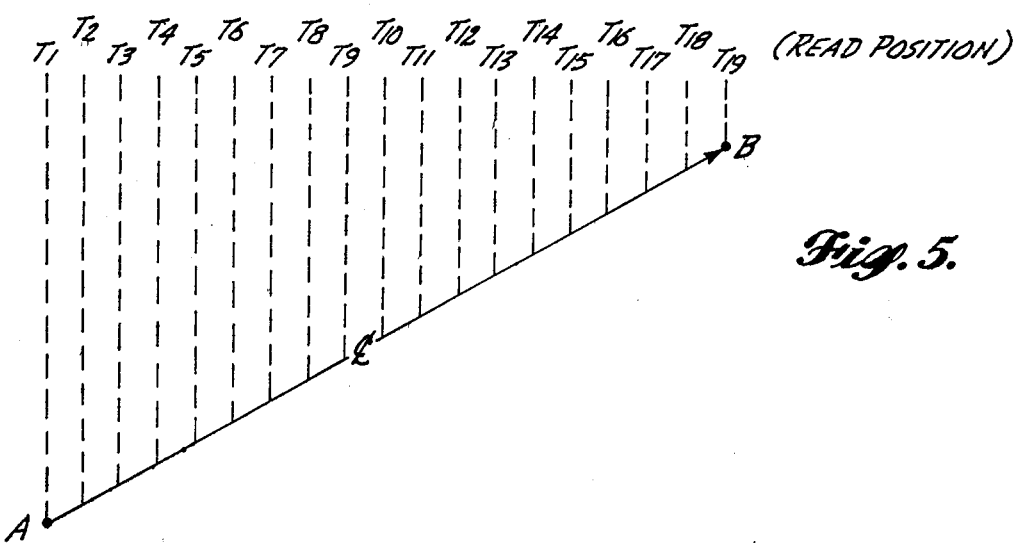
FIG. 5 is a line diagram of a single centerline vector, illustrating the timing of the reading of cutter position with respect to the vector.

FIG. 5 also illustrates vector ATB. However, in FIG. 5 vector ATB is separated into a plurality of equally-spaced measuring times designated T1, T2, T3, etc. More specifically, at times T1, T2, T3, etc., the position of the cutter (or the part, whichever is movable) along the various sensed axes is determined. While, as illustrated, the time interval between measuring times ($\Delta T$) is preferably equal, if desired, unequal intervals may be utilized. However, if uneven intervals are chosen, the hereinafter described procedures for determining average velocity and other factors become more complex because they must take into account the use of uneven intervals in their time constants.

Figure 5A:
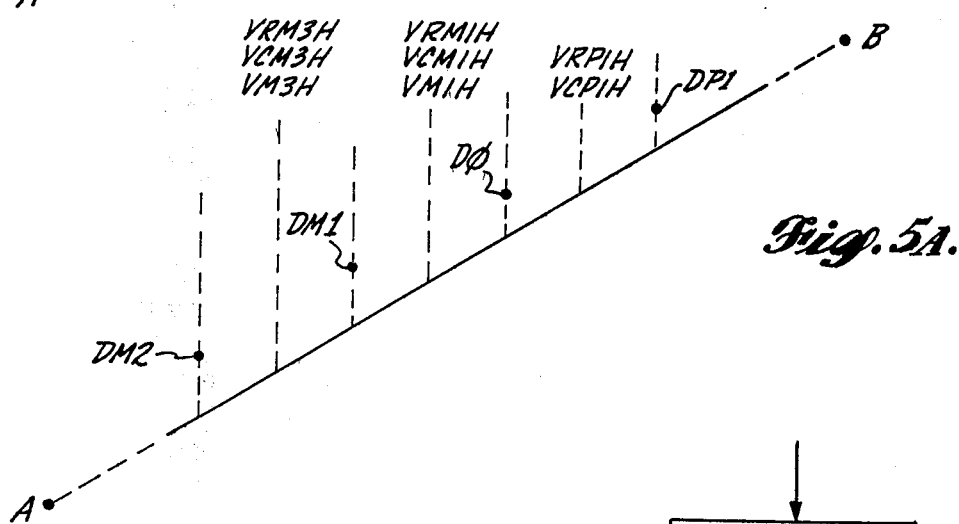
FIG. 5A is an enlarged diagram of a portion of FIG. 5.

FIG. 5A is an enlarged view of a portion of FIG. 5 and illustrates four positions at which the position of the cutter along the control axes is sensed. The current position is the $D\emptyset$ (D zero) vector position noted above. The immediately preceding vector position is denoted DM1 (D minus one interval). The vector position preceding the DM1 position is denoted DM2 (D minus two intervals). The next succeeding vector position is denoted DP1 (D plus one interval). As can be observed from these definitions if, for example, $D\emptyset$ is assumed to be the cutter position at time T7, DM1 is the cutter position at time T6, DM2 is the cutter position at time T5 and DP1 is the cutter position at time T8.

Illustrated between adjacent measuring times are average velocity and count terms. The nature and determination of the values of these terms is described below. However, for purposes of orientation, they are briefly described here. In this regard, the illustrated terms are VM1H, VM3H, VCM1H, VCM3H, VCP1H and VRP1H. VM1H denotes the average velocity over the immediately preceeding interval, i.e., the interval between DM1 and D∅. Specifically, this nomenclature (VM1H) stands for velocity (V) minus (M) one-half (1H) to denote the average velocity during the immediately preceeding (minus) interval, which is defined by the DM1 and D∅ readings. Average, of course, denotes to some degree the velocity at the mid-point of the interval (which is true if the velocity change is linear-)—hence, the one-half (1H) portion of the term.

VM3H denotes the average velocity during the interval immediately preceeding the present interval, i.e., between DM1 and DM2. The nomenclature VM3H stands for velocity (V) minus (M) three halves (3H). VCM1H denotes velocity (V) counts (C) minus (M) one-half (1H) and VCM3H stands for velocity (V) counts (C) minus (M) three halves (3H). These two terms lie between D∅ and DM1, and DM1 and DM2, respectively. VCP1H denotes velocity (V) counts (C) plus (P) one-half (1H) and VRP1H denotes velocity (V) requested (R) plus (P) one-half (1H). The latter terms lie in the interval between D∅ and DP1. Finally VRM1H denotes velocity requested minus one-half and VRM3H denotes velocity requested minus three halves. The latter terms lie in the interval between D∅ and DM1, and DM1 and DM2, respectively.

Figure 6:
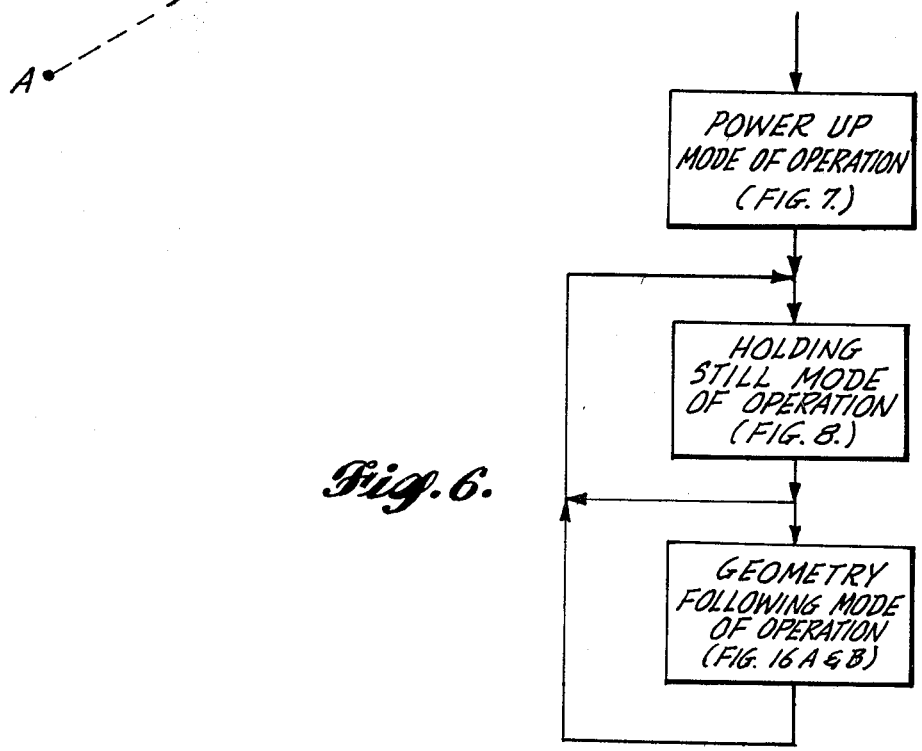
FIG. 6 is a block diagram of the main modes of operation of a machine tool controller formed in accordance with the invention.
Figure 16:
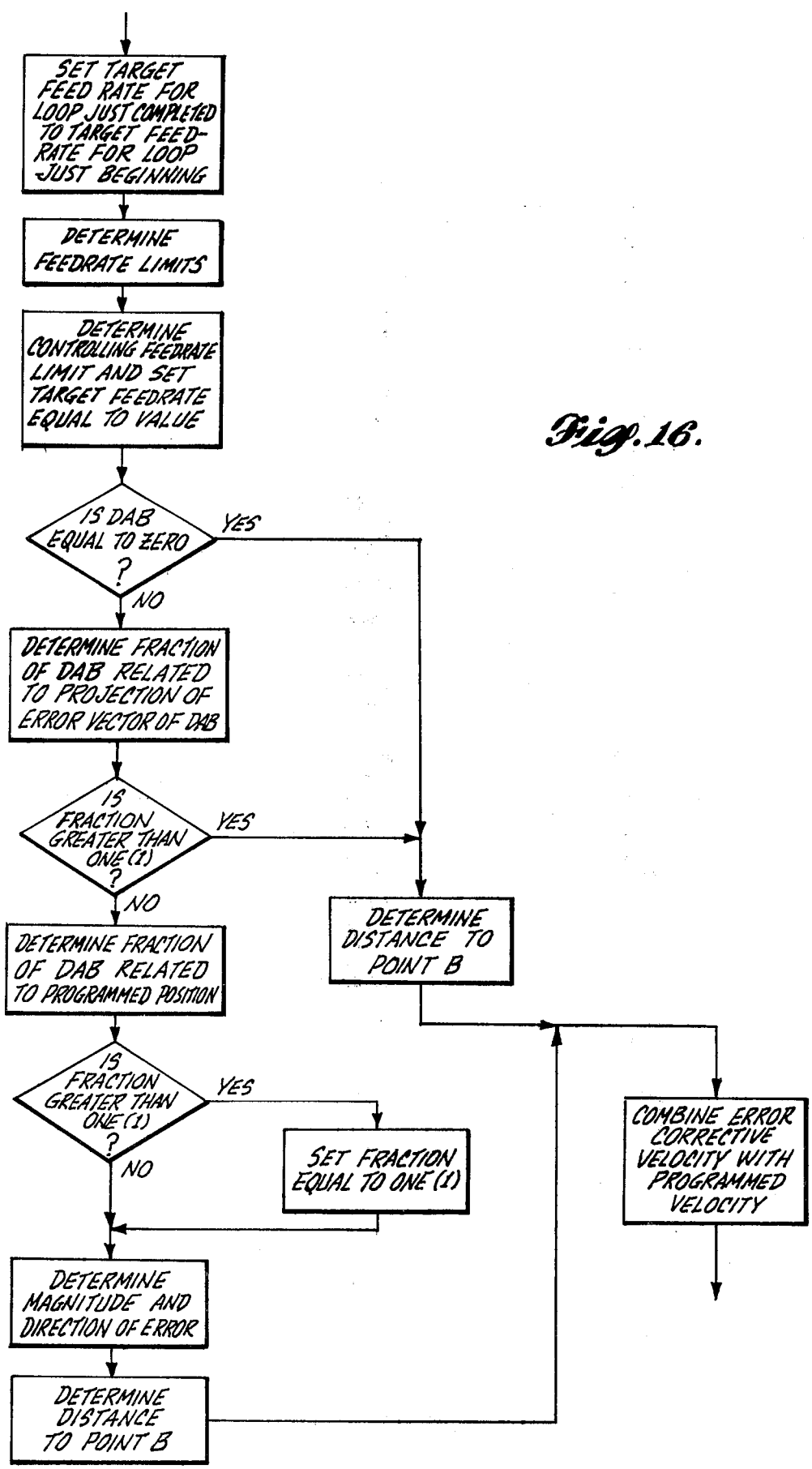
FIG. 16 is a summary flow diagram of the CTL subroutine that can be entered during various modes of operation and subroutines.

FIG. 6 is a block diagram illustrating the major modes of operation of the central processing unit of a machine tool controller and part inspection monitor formed in accordance with the invention. The major modes of operation are the power-up mode of operation, which occurs only when power is initially applied to the central processing unit; the holding still mode of operation, which occurs when the cutter is to remain at a fixed position along the part cutting centerline; and, the geometry following mode of operation, which occurs when the cutter follows the part centerline. As noted in FIG. 6, the power-up, holding still, and geometry following modes of operation are illustrated in FIGS. 7, 8 and 16, respectively.

As illustrated in FIG. 7, during the power-up mode of operation, a variety of parameters (used during the other modes of operation in the manner hereinafter described) are set equal to an initial value. Then the axis position sensors are "read" as D∅∅ values and certain terms are set equal to these values. The following table sets forth the mnemonic terms used in this description; whether or not they define scaler or vector quantities; their initial value or the fact that they are set equal to the initial position sensor value (D∅∅); and, a brief definition of their nature.

TABLE I

| MNEMONIC | TYPE | INITIAL VALUE | DESCRIPTION (At beginning of Loop Execution) |
|---|---|---|---|
| ACA | Scalar | 1.0 | Acceleration limit parallel to feed path |
| ACB | Scalar | 1.0 | Deceleration limit parallel to feed path |
| ACE | Scalar | 1.0 | Acceleration limit normal to feed path |
| ATB | Vector | 0.0 | Vector from PTA to PTB |
| DAB | Scalar | 0.0 | Length of vector from PTA to PTB |
| DB | Scalar | 0.0 | Squared distance from XC to PTB |
| DC | Scalar | 0.0 | Squared length of DX2 |
| DM1 | Vector | D∅∅ | Recursive filtered position one program loop previous |
| DN | Scalar | 0.0 | Squared distance from D∅ to XC |
| DNE | Scalar | 0.0 | Filtered DN used in calculating ACE |
| DX2 | Vector | 0.0 | Corrective vector determining size and direction of position based velocity feedback |
| D∅ | Vector | D∅∅ | Recursive filtered current position |
| D∅∅ | Vector | Meas. | Position as read from position sensors |
| FKNOB | Scalar | Set | Feedrate override knob setting (range is 0 to 1) |
| LIMF | Scalar | 0.0 | Indicator of whether feed is limited by acceleration, deceleration or PFD |
| MDRV | Vector | 0.0 | Integer counts for Drive cards |
| PDNE | Scalar | 0.0 | DNE from previous loop |
| PFD | Scalar | 0.0 | Centerline specified programmed feedrate |
| PRF | Scalar | 0.0 | Target feedrate for loop just completed |
| PTA | Vector | D∅∅ | Starting point of current movement vector |
| PTB | Vector | D∅∅ | Ending point of current movement vector |
| PVE | Scalar | 0.0 | VE from previous loop |
| RF | Scalar | 0.0 | Target feedrate for loop just beginning |
| TC | Scalar | 0.0 | Fraction of distance from PTA to PTB corresponding to XC |
| TOLER | Scalar | 0.0 | Centerline data specified cutting tolerance |
| T∅ | Scalar | 0.0 | Fraction of distance from PTA to PTB corresponding to instantaneous programmmed position |
| VCM1H | Vector | 0.0 | Drive counts sent at beginning of loop just completed |
| VCM3H | Vector | 0.0 | Drive counts sent at beginning of loop before that just completed |
| VE | Scalar | 0.0 | Filtered (VM1H)$^2$ used in calculating |

TABLE I-continued

| MNEMONIC | TYPE | INITIAL VALUE | DESCRIPTION (At beginning of Loop Execution) |
|---|---|---|---|
| VMAX | Scalar | Set | Max feedrate N/C machine is capable of ACE |
| VM1H | Vector | 0.0 | Average velocity over just completed program loop |
| VM3H | Vector | 0.0 | Average velocity over program loop before just completed loop |
| VO | Array of Vectors | 0.0 | Each element is the offset vector in distance per time over a velocity range as described for VS |
| VRM1H | Vector | 0.0 | Requested velocity of just completed program loop |
| VRM3H | Vector | 0.0 | Requested velocity of program loop before just completed loop |
| VRP1H | Vector | 0.0 | Requested velocity based on programmed feedrate and direction and position feedback |
| VS | Array of Vectors | 1.0 | Each element of the array is the sensitivity vector in distance per time per count of the machine response to drive card counts over a velocity range as follows: Element # Range  1 −VMAX to −.8 VMAX  2 −.8 VMAX to −.2 VMAX  3 −.2 VMAX to 0  4 0 to +.2 VMAX  5 +.2 VMAX to +.8 VMAX  6 +.8 VMAX to +VMAX |
| XC | Vector | D∅∅ | Projection of D∅ on centerline cutting path |

After the power-up mode of operation is complete, the holding still mode of operation, illustrated in FIG. 8, is entered. The first step of the holding still mode of operation is to determine whether or not measurement or power system errors exist. Measurement errors are errors in the output of the position sensors. In essence, during this step the central processing unit goes through a subroutine that tests the position sensors to determine if their outputs are error free. If a position sensor output indicates that the related carriage is off its ways, for example, an error exists. If an error is found to exist, a subroutine causing a readout indicating the nature and source of the error is executed. Alternatively, or in addition, test subroutines related to a particular type of position sensor are executed at this time. If such subroutines indicate a measurement error exists, a suitable readout subroutine is executed to create a display of the source and nature of the error. Further, the voltage level of the power applied to the overall machine tool controller (and, if desired, to various major subsystems) is tested to determine whether or not it lies within an acceptable range. And/or, if the machine tool is hydraulically controlled, hydraulic fluid pressure and temperature are measured to determine if they are at proper levels. If an error is found to exist, an appropriate subroutine is executed to create a display of the error and its source.

If no measurement or power system errors exist, the holding still mode next determines whether or not any control panel requests exist. In this regard, as illustrated in FIG. 2 and previously described, the console includes control panel switches. The control panel switches are designed to allow the operator of the machine tool controller of the invention to cause the controller to execute any one of several desired subroutines. An example of such a subroutine is the run command subroutine illustrated in FIG. 9 and hereinafter described. Other suitable subroutines are briefly described below.

The control panel switches may take on various forms. For example, they may comprise a series of toggle switches. Alternatively, one or more rotary switches can be utilized. Still further, thumb wheel switches (with suitable indicators) can be utilized to insert a code (digital) representing a desired subroutine. In any event, if a control panel request is present, the position of the control panel switches is "read;" and, the designated subroutine is executed.

If no control panel request is present, the holding still mode of operation proceeds to the next step, which is a test to determine if any keyboard commands have been entered by the operator. Like control panel requests, keyboard commands allow the operator to communicate with the machine tool control system so as to cause a desired subroutine to be executed.

The majority of the subroutines available to be executed, either as a result of a control panel request or a keyboard command, are relatively conventional subroutines. Typical of these conventional subroutines are the following:

INIT: initialize floppy disc
LIST: list file names on floppy disc
LOAD: load a new file onto the floppy disc
PURGE: purge a file from the floppy disc
SPINDL: turn machine tool spindles on or off
COOLNT: turn machine tool coolant on or off
IJOG: jog the machine by the X, Y, Z increment set on the control panel switches
CJOG: jog continuously in X, Y, Z at the velocity set on the control panel switches
MIRROR: mirror the axes indicated by the control panel switches.

Since other well known subroutines may be included in an actual embodiment of the invention, the foregoing list is to be construed as exemplary, rather than limiting. In any event such conventional subroutines are not described herein because they are well known and do not per se form part of the present invention. However, it should be noted that, as is typical, override control panel requests and keyboard commands can be inserted to override the present operation, when desired.

If no control panel requests and/or keyboard command are present, the holding still mode of operation enters an idle position maintaining sequence, which combines two subroutines denoted the GOV and the MCHN subroutines. While these two subroutines are hereinafter described in detail, in general, they continuously determine the position of the cutter with respect to the cut starting point (or if the part is partially cut, the point at which the cutting was stopped). Based on the position data, these two subroutines determine the transfer function of the machine tool and use the transfer function information in combination with start position data to control the relative position of the cutter and the part. Specifically, these subroutines produce position control signals that control movement of the part or cutter (as the case may be) along the controlled axes so as to maintain the part/cutter at the correct position. This is done to compensate for position errors resulting from the dynamic movement of the machine tool, even though part cutting is not taking place. In general, as will be better understood from the following description, the GOV subroutine determines the correction vector, DX2, and the displacement compensation velocity necessary to hold the cutter at a relative fixed point with respect to the part. The MCHN subroutine adds velocity compensation to the displacement compensation and indexes the result to the correct segment of a sensitivity and offset curve that forms part of the transfer function of the machine tool. The curve is used to convert the velocity correction into counts and the result is used to control movement of the cutter and/or the part. Then the MCHN reads the position of the cutter and/or part and updates the transfer function. Thus, in essence, the MCHN subroutine adds velocity feedback to the velocities determined by the GOV subroutine and uses an estimated transfer function (based on prior passes through the GOV and MCHN subroutines) to calculate axis drive card counts (e.g., digital motor drive control pulses). The MCHN subroutine sends the counts to the D-to-A converters 33 (FIG. 1) and revises the estimated transfer function based on the machine tool response.

After pass through the GOV and MCHN subroutines, the holding still mode of operation determines whether or not the geometry following mode of operation should be entered. If so, that mode of operation is entered. If the geometry following mode of operation is not to be entered, the holding still mode of operation cycles back to the start of the holding still mode of operation; and, that mode of operation is repeated.

FIG. 8 also illustrates that a pass through the GOV and MCHN subroutines is made after completion of the subroutine entered as a result of any one of: a measurement or power system error; a control panel request; or a keyboard command. Such passes are made, of course, to update the transfer function and maintain the cutter/part positioning correct.

As will be readily appreciated by those familiar with data reading subsystems used in connection with numerical controllers for machine tools, instructions can be stored on various media. For example, instructions can be stored on punched tape; magnetic tape; floppy discs, etc. For purposes of describing the present invention, and because such storage media is presently the most preferred storage media, it is assumed that numerically controlled instructions are recorded on floppy discs. However, it is to be understood that this choice is by way of example only and that such instructions can be recorded on other suitable storage media, if desired.

Figure 9:
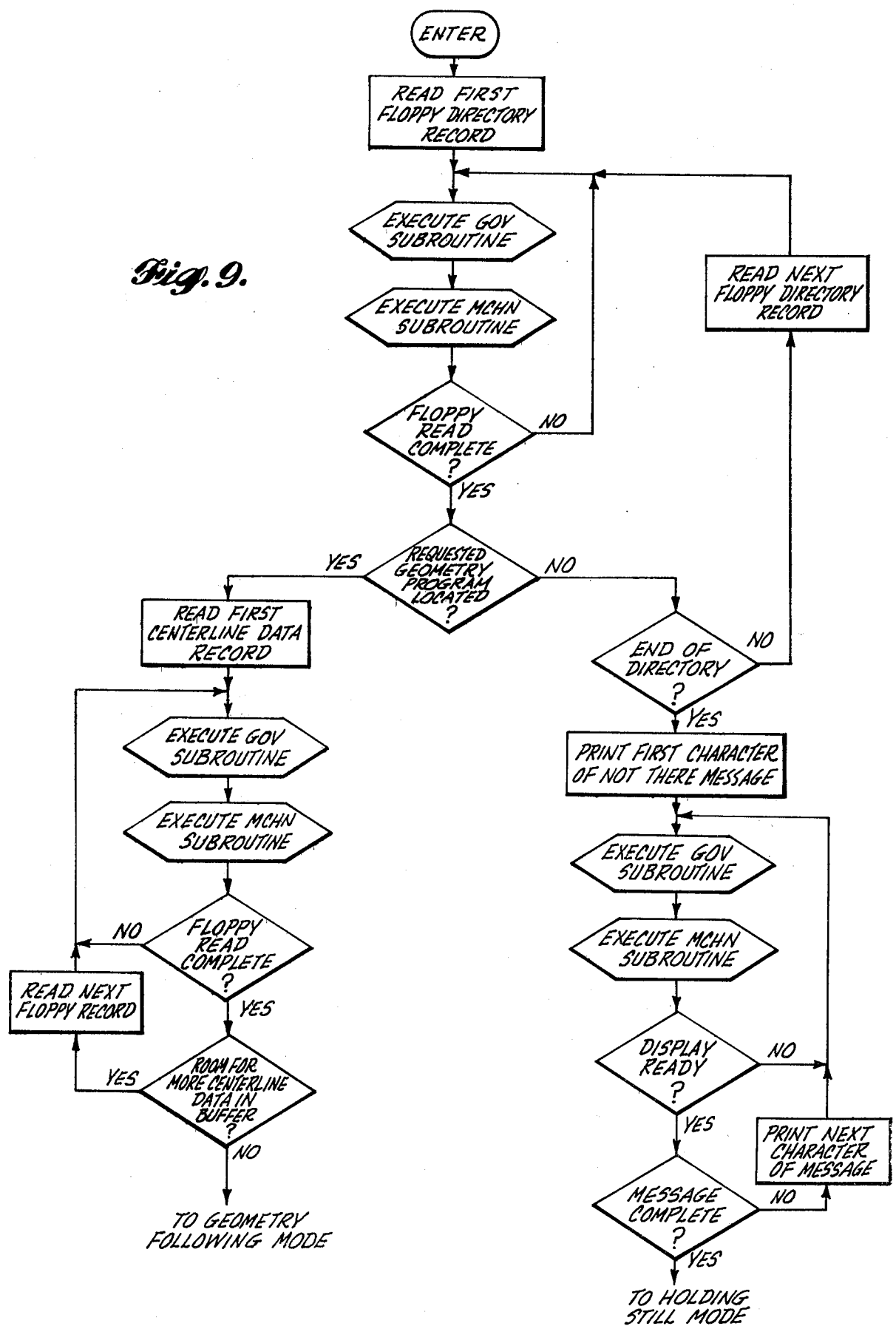
FIG. 9 is a flow diagram of a run command subroutine that can be entered during the holding still mode of operation illustrated in FIG. 8.

Turning now to the run subroutine illustrated in FIG. 9; the first step after this subroutine is entered (which occurs when the operator requests that a particular part cutting program be run either via a control panel request or a keyboard command) is to start to read the first floppy directory record into the memory 35 (FIG. 1) associated with the central processing unit 31. The first floppy directory record is the first of several floppy disc directory records that list the various part cutting programs contained on the floppy disc. After the reading of the first floppy directory record has started, the run subroutine makes a pass through a GOV and MCHN subroutine sequence in order to update the estimated transfer function of the machine tool and maintain the desired position of the cutter with respect to the part at the start (0, 0) position.

Next, the run subroutine determines whether or not the reading of the first floppy directory record is complete. If not, another pass through the GOV and MCHN subroutines is made. Passes through the GOV and MCHN subroutines continue until the reading of the first floppy directory record is complete. Then a test is made to determine whether or not the requested part cutting (geometry) program is listed in the directory data now in the memory 35. If the requested part cutting (geometry) program is not in the memory, a test is made to determine whether or not all of the floppy directory records on the floppy disc have been read. If not, the next floppy directory record is read; and, while that floppy directory is being read, passes are continuously made through the GOV and MCHN subroutines, whereby the estimated transfer function of the machine tool is continuously updated and the desired position of the cutter with respect to the starting (e.g., 0, 0) position is maintained.

If the end of the directory is reached without the requested geometry program being located, the first character of a NOT THERE message is printed. While this character is being printed, a pass through the GOV and MCHN subroutines is made to update the estimated transfer function of the machine tool and maintain the desired position of the cutter with respect to the part. Next, a test is made to determine whether or not the display is ready for the next character. If not, another pass is made through the GOV and MCHN subroutines. When the display is ready for the next character, a test is made to determine whether or not the message is complete. If not, the next character of the NOT THERE message is printed. While this character is being printed, passes are continuously made through the GOV and MCHN subroutines. Then another character is printed. This manner of operation continues until the entire NOT THERE message is printed (and/or displayed). When the NOT THERE message is complete, the run subroutine shifts to the holding still mode of operation illustrated in FIG. 8 and previously described. Obviously the NOT THERE message is only exemplary. Any other suitable message, such as NOT LISTED, NOT ON FLOPPY DISC or the like can be displayed or printed, if desired.

Turning next to the path that is followed when the requested geometry program is listed on one of the floppy directories; immediately after the requested geometry program is located in one of the directories, the floppy disc readout shifts to the appropriate point on the disc and the first centerline data record is read out and stored in a buffer memory. (The centerline data record is, of course, the first set of programmed centerline control data stored on the floppy disc.) As the first centerline data record is being read into the buffer memory, passes are continuously made through the GOV and MCHN subroutines in order to update the estimated transfer function of the machine tool and maintain the desired position (e.g., 0, 0) of the cutter with respect to the part. After the first centerline data record has been read into the buffer memory, a test is made to determine whether there is room for more centerline data in the buffer memory. If so, the next centerline data record is read into the buffer memory. While this data is being read in, passes are continuously made through the GOV and MCHN subroutines. When the buffer memory is full, the invention shifts to the geometry following mode of operation illustrated in FIG. 15A and B and hereinafter described. Prior to describing the geometry mode of operation, a description of the GOV and MCHN subroutines is set forth.

Prior to describing the GOV and MCHN subroutines, it is pointed out that these descriptions (and the CTL subroutine described later) use for the most part vector notation. Further steps in the subroutines that are clearly obvious to a person skilled in the data processing field are not illustrated and described in detail. For example, in many instances the previous value of a particular term (e.g., VS) is updated. The subroutines do not show the change in nomenclature from the updated value (e.g., $VS_K$) to the previous value (e.g., $PVS_K$), even though such nomenclature updating is clearly required, as shown by the related updating equations (e.g., $VS_K = 0.001\ VSQ + 0.999\ PVS_K$).

FIG. 10 illustrates the GOV subroutine. The first step after entering the GOV subroutine is to zero all error components (DB, DC and DN) and target feed rates (RF and PRF). The next step is to determine the correction vector (DX2). As illustrated in FIG. 10, DX2 is determined in accordance with the equation $DX2 = XC - D\emptyset$. XC, of course, is zero when the machine tool controller is idling around the starting point. After a part has been partially cut, XC is determined by a vector end point (or mid vector point if the cutting is stopped at such a point). $D\emptyset$ is a recursively filtered value of the sensed position data ($D\emptyset\emptyset$) and is determined during the MCHN subroutine. After DX2 has been determined, the requested velocity (VRP1H) based on the maximum acceleration limit normal to the feed path (ACE) is determined. VRP1H is determined in accordance with the equation:

$$VRP1H = \sqrt{(ACE) - \sqrt{DX2}} \tag{1}$$

Where $\sqrt{DX2}$ represents the square root of each vector component forming DX2. Finally, the GOV subroutine determines the squared error normal to the feedpath (DN). Since the feedpath is a point, as illustrated in FIG. 10, DN is equal to the magnitude of DX2 squared.

Figure 13A:
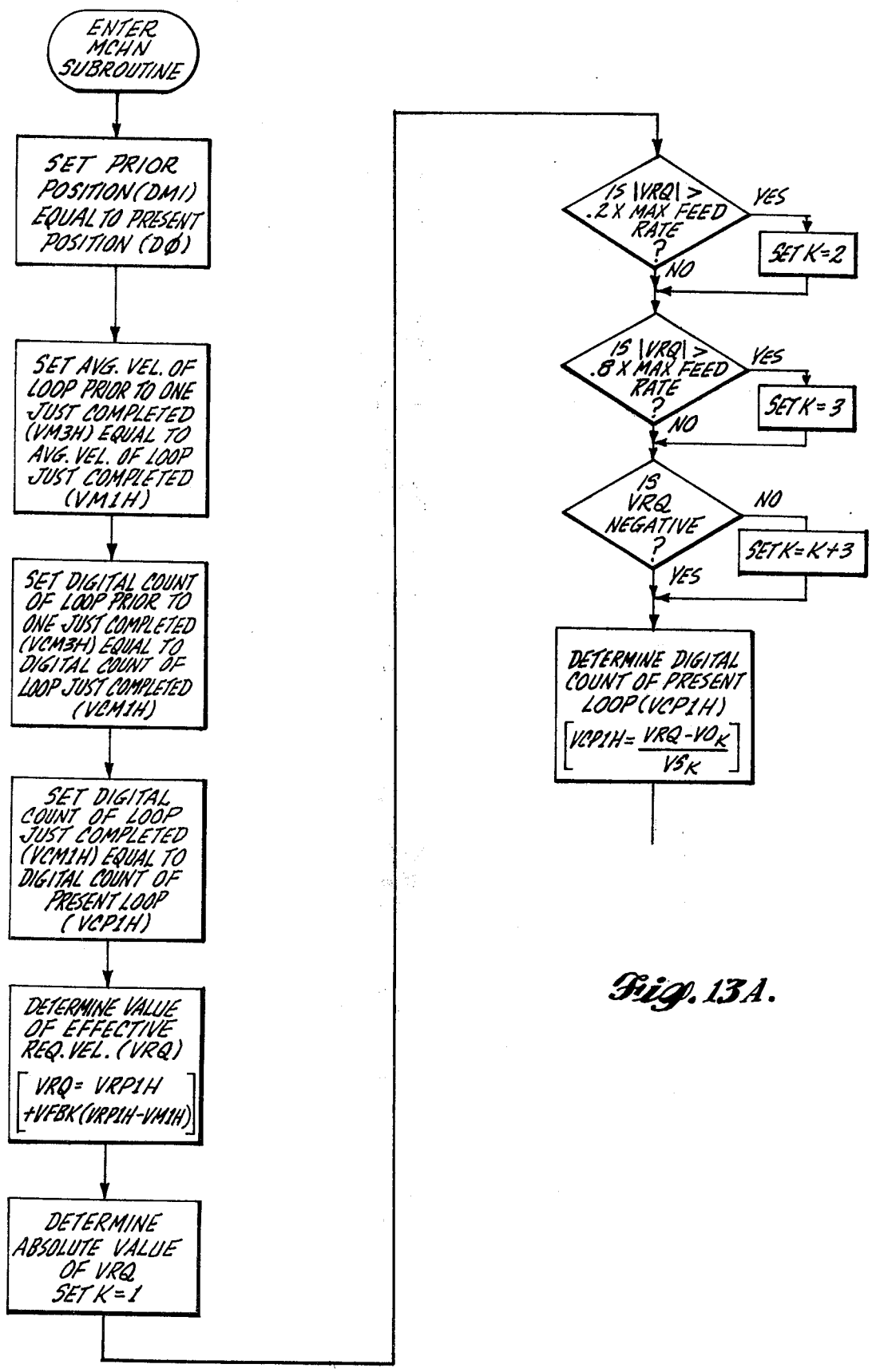

The MCHN subroutine is substantially more complicated than the GOV subroutine. In order to better understand the MCHN subroutine it is summarized in FIG. 11 and illustrated in detail in FIGS. 13A–13E. Further, rather than starting with the reading of sensor position data and ending with the application of control signals to the motor drives, the MCHN subroutine begins in the mid region of this more normal sequence. This procedure is used because the MCHN subroutine uses the transfer function determined during the immediately preceding pass to develop axis control signals and then senses the position of the part and/or cutter and updates the transfer function based on the sensed data. Thus, the disclosed technique of mid region entry is used because it is a more efficient method of making available certain data when needed. In order for the combination of the illustrated and described GOV and MCHN subroutines to be more readily understood FIG. 14 is included. FIG. 14 illustrates the more significant steps of the combined GOV and MCHN subroutines in a more "normal" start (read) to finish (drive) sequence, even though that sequence is not preferred.

Figure 12:
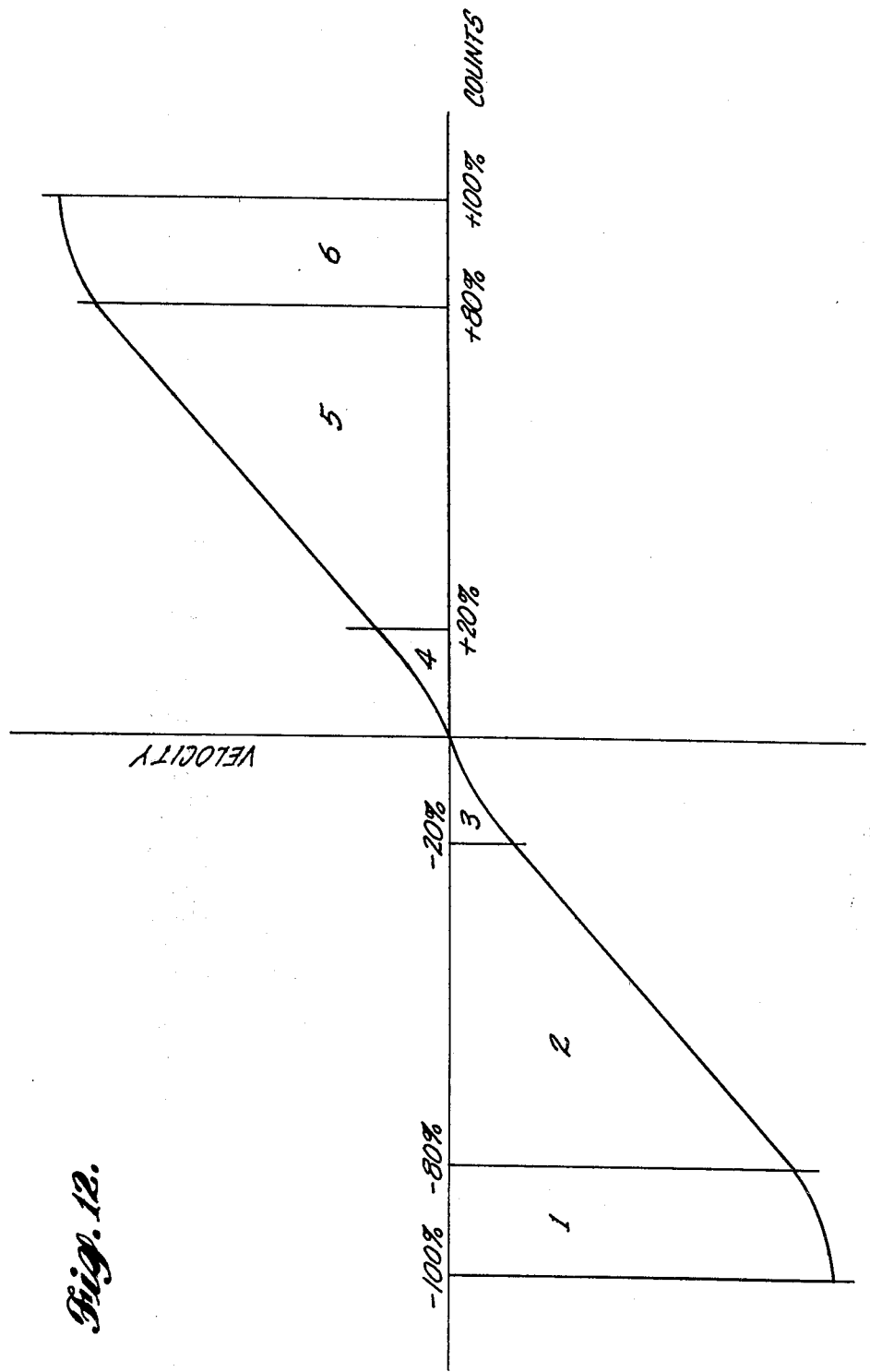
FIG. 12 is a waveform illustrating a typical sensitivity and offset curve determined during the operation of the invention.

The MCHN subroutine starts by updating certain velocity and count values (not illustrated in FIG. 11). Then velocity compensation is added to displacement compensation. Velocity compensation is based on a value of velocity feedback determined during the immediately preceding pass through the MCHN subroutine. (Velocity feedback forms one aspect of the machine tool transfer function.) Displacement compensation, of course, is based on the VRP1H value determined during the GOV subroutine. After the combined velocity and displacement compensation has been determined, the correct segment of a sensitivity and offset curve is determined. An example of a sensitivity and offset curve developed by the invention is illustrated in FIG. 12. This curve relates velocity values to count values. It is broken into the illustrated six segments defined by Element numbers 1 through 6 in Table I for the VS and VO terms. Since the sensitivity and offset curve relates velocity values to count values, the curve, in essence, forms another aspect of the transfer function of the machine tool. It is segmented because, broadly, the segments define ranges wherein the relationship (slope) between velocity and counts is generally similar. The updating of the sensitivity and offset curve segments occurs during the MCHN subroutine in the manner hereinafter described. It should be noted that the number of segments of the sensitivity and offset curves and the location of the segments in terms of percent of maximum velocity may be different for different machines. Thus, the sensitivity and offset curve illustrated in FIG. 12 should be taken as exemplary and not as limiting.

In any event, after the combined velocity and displacement compensation (denoted VRQ) is determined, and indexed to the appropriate segment of the sensitivity and offset curve, the vector velocity value is converted to axis count values. Thereafter, the axis count values are used to control the drive motors. That is, as required, the motors that move the carriages are energized in accordance with the count value for the related axis. Next, the position of the tool (or part) along each axis is read from the position sensors. Then, the vector position data is recursively filtered to remove rapid data changes, i.e., high frequency data components, so that smooth data is provided. Next, a measured value of velocity is determined, based on the position data. The measured value of velocity is then utilized to update the appropriate segment of the sensitivity and offset curve. In this regard, as noted above, the sensitivity and offset curve is not a static curve. Rather, the curve is continuously updated based on measured data. Consequently, as wear or other factors effect the response of the machine tool, compensation is automatically provided by changing the shape of the related segment of the sensitivity and offset curve. Thus, this aspect of the machine tool transfer function is updated.

The next step illustrated in the MCHN subroutine summary (FIG. 11) is to determine the velocity feedback. Thus, this aspect of the machine tool transfer function is updated. Thereafter, if required, the deceleration limit parallel to the cutting centerline is updated. Next, the acceleration limit parallel to the cutting centerline is updated, if required. Finally, the acceleration limit normal to the part cutting centerline is determined. The parallel and normal acceleration limits are of particular importance when a part is being cut, i.e., the system is in the geometry following mode of operation hereinafter described, and sharp turns are required, because the cutting speed must be controlled such that the required turn can be made without overshoot. In any event, these limits form the remaining aspects of the machine tool transfer function.

FIGS. 13A-E illustrate in more detail the MCHN subroutines. Immediately after the MCHN subroutine is entered, the prior position (DM1) is set equal to the present position. (D∅). Next the average velocity of the loop prior to the one just completed (VM3H) is set equal to the average velocity of the loop just completed (VM1H). Next the digital count of the loop prior to the one just completed (VCM3H) is set equal to the digital count of the loop just completed (VCM1H). In summary, the first four steps of the MCHN subroutine update the value of certain terms.

The next step in the MCHN subroutine is to determine the value of the effective requested velocity (VRQ). As previously indicated, this result is achieved by adding the velocity compensation to the displacement compensation. More specifically, as illustrated in FIG. 13A, VRQ is determined by adding VRP1H (determined during the immediately preceding GOV subroutine) to the value of VFBK (VRP1H - VM1H). In the latter term, VFBK is updated later in the MCHN subroutine, as illustrated in FIG. 11; VM1H was updated in the second step of the MCHN subroutine as noted above.

The next step in the MCHN subroutine is to determine the absolute value of the effective requested velocity (VRQ) and set a factor, denoted the K factor, equal to 1. Next a test is made to determine whether or not the absolute value of VRQ is greater than 0.2 times the maximum feed rate of the machine tool. If the absolute value of VRQ is greater than 0.2 times the maximum feed rate of the machine tool, K is set equal 2. If not, a test is made to determine whether or not the absolute value of VRQ is greater than 0.8 times the maximum feed rate of the machine tool. If the absolute value of VRQ is greater than 0.8 times the maximum feed rate of the machine tool, K is set equal to 3. If not, a test is made to determine whether or not VRQ is negative. If VRQ is negative, K is set equal to the previous value of K plus 3. If VRQ is positive it remains the same. In this way the K value is updated to the appropriate segment number of the sensitivity and offset curve (FIG. 12).

After the value of the K factor is determined, the digital count of the present loop (VCP1H) is determined in accordance with the equation:

$$VCP1H = \frac{VRQ - VO_K}{VS_K} \quad (2)$$

where $VO_K$ is the offset value of the K segment of the sensitivity and offset curve and $VS_K$ is the sensitivity value of the K segment of the sensitivity and offset curve.

Figure 13B:
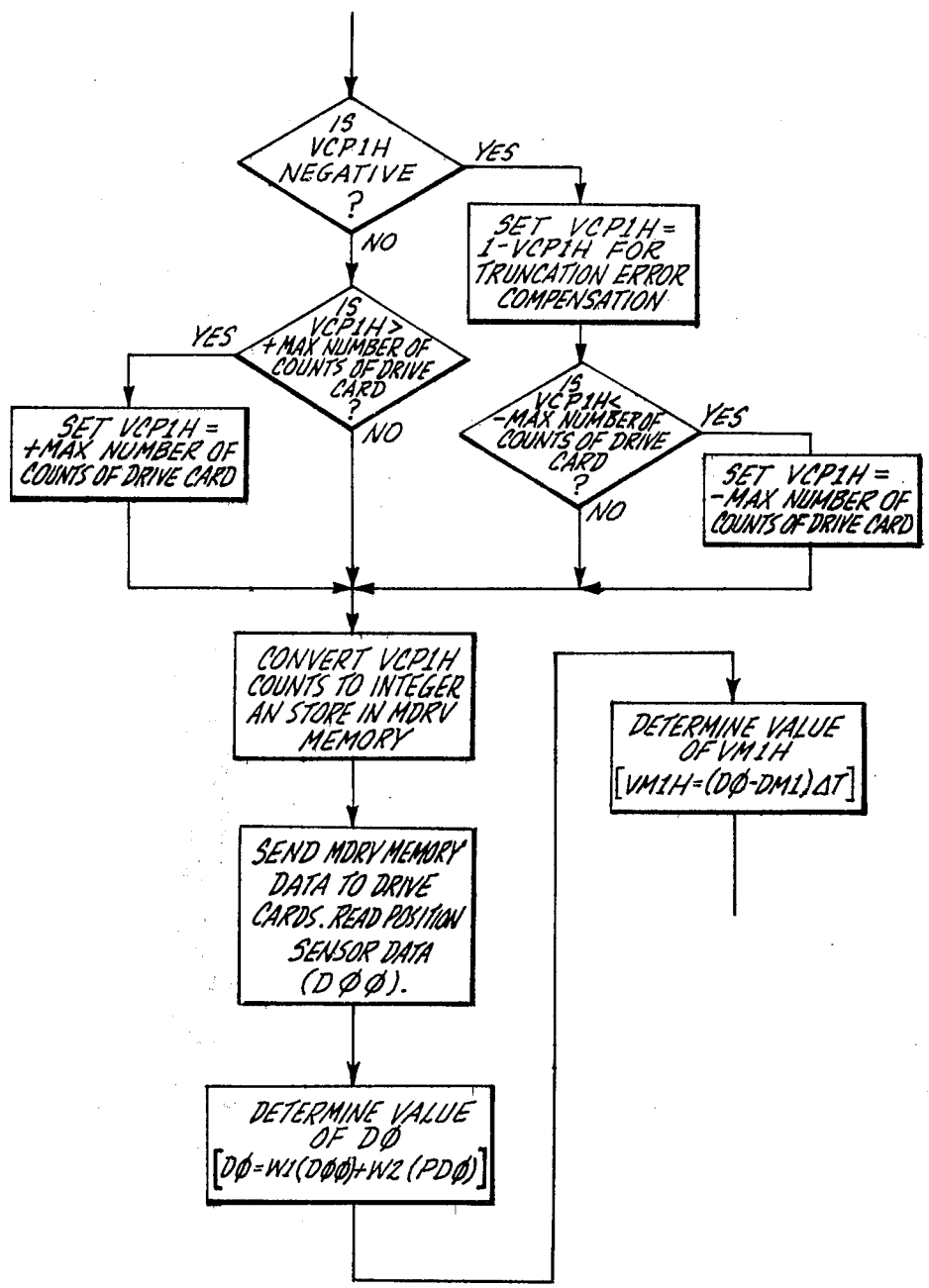
Figure 14:
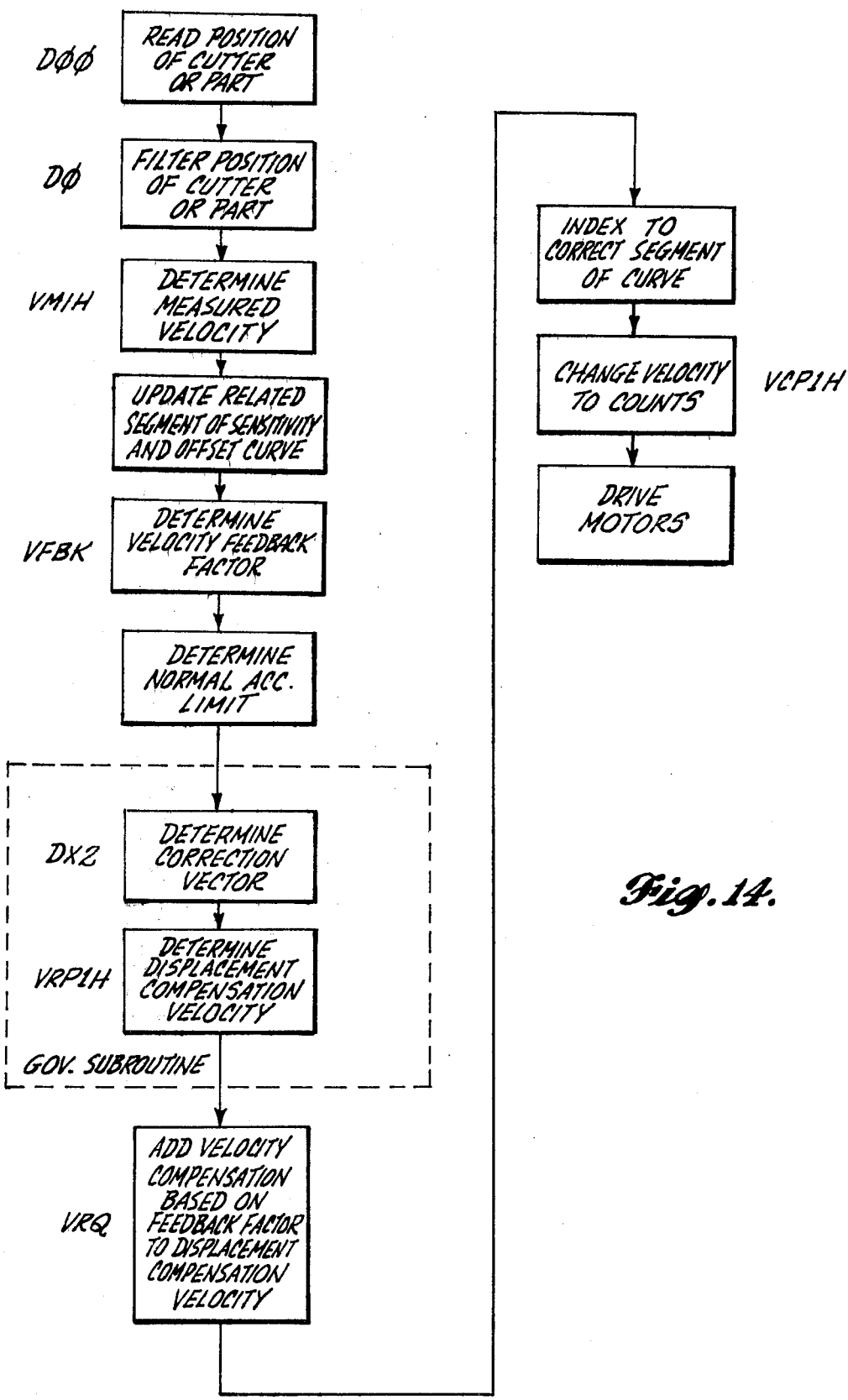
FIG. 14 is a read-to-move flow diagram of a pass through the combined GOV and MCHN subroutines.

After the value of VCP1H is determined a test is made to determine whether VCP1H is positive or negative (see FIG. 13B). If VCP1H is negative, then VCP1H is set equal to one (1) minus VCP1H in order to provide truncation error compensation. Then a test is made to determine if the new value of VCP1H is less than the maximum number of counts that can be produced by the drive card in the negative direction of axial movement. If VCP1H is greater than the maximum number of counts that can be produced by the drive card in the negative direction, VCP1H is set equal to the maximum number of counts that can be produced by the drive card in the negative direction. If VCP1H is less than the maximum number of counts that can be produced by the drive card in the negative direction, VCP1H remains at its previous value. In other words, VCP1H is set to a negative limiting value if the calculated value of VCP1H is greater (in the negative direction) than the limit. This sequence is, of course, based on a sign magnitude motor drive card and would differ if a 1's complement or a 2's complement motor drive card is to be used in an actual embodiment of the invention. All three types of motor drive cards are equally common at the present time.

If the initial test of VCP1H shows that VCP1H is positive, a test is made to determine whether VCP1H is greater than the maximum number of counts that can be produced by the drive card in the positive direction of axial movement. If VCP1H is greater than the maximum number of counts that can be produced by the drive card in the positive direction, VCP1H is set equal to the maximum number of counts that can be produced by the drive card in the positive direction. Alternatively, if VCP1H is less than the maximum number of counts that can be produced by the drive card in the positive direction, VCP1H remains at its previous value. In this way VCP1H is set to a positive limiting value if the calculated value of VCP1H is greater (in the positive direction) than the limit.

After one of the previously described paths is followed (which are mutually exclusive as illustrated in FIG. 13B) to determine the final value of VCP1H, the VCP1H count value is converted to an interger value. The interger value is then stored in a motor drive (MDRV) memory, which may be formed by part of the main memory 35 illustrated in FIG. 1. Next, at the appropriate time, the integer control signal stored in the MDRV memory is read out, converted from vector form to axis form and used to control the application of power by drive cards to the motor drives, whereby the tool and/or part is moved along the controlled axes. At approximately the same time, the position of the part and/or the tool is read by the position sensors. The resultant sensed vector position signal (D∅∅) is recursively filtered to determine the value of D∅. Specifically D∅ is equal to W1 (D∅∅)+W2 (PD∅) where filter constants W1 and W2 have arbitrary fixed values and PD∅ is the prior value of D∅. More specifically, the W1 and W2 constants are chosen so that the recursive filter removes high frequency components from the position signals. Preferably components having frequencies above 300 Hz are removed. Alternatively, frequency components above 150 Hz, or other reasonable frequencies, could be filtered out, if desired.

After the new value of D∅ has been determined, the value of VM1H is determined in accordance with the equation VM1H=(D∅−DM1)/ΔT. As noted above with respect to FIG. 5, ΔT is the fixed time interval between position sensor readings. Then (FIG. 13C), a test is made as to determine whether or not VCM1H is equal to VCM3H. If the value of these terms are the same, the related segment of the sensitivity and offset curve does not need to be updated. Contrariwise, if the values of VCM1H and VCM3H differ, updating of the sensitivity and offset curve takes place. The first step in the updating sequence is to determine the effective velocity sensitivity (VSQ) in accordance with the equation:

$$VSQ = \frac{VM1H - VM3H}{VCM1H - VCM3H} \quad (3)$$

The next step is to determine the effective velocity offset (VOQ) in accordance with the equation:

$$VOQ = VM1H - VSQ(VCM1H) \quad (4)$$

The third step in the sensitivity and offset curve updating sequence is to filter the velocity sensitivity ($VS_K$) for the related (e.g., K) segment in accordance with the equation:

$$VS_K = 0.001 VSQ + 0.999 PVS_K \quad (5)$$

where $PVS_K$ is the prior value of $VS_K$. The final step in the sensitivity and offset curve updating sequence is to filter the velocity offset ($VO_K$) in accordance with the equation:

$$VO_K = 0.001 VOQ + 0.999 PVO_K \quad (6)$$

where $PVO_K$ is the prior value of $VO_K$. It will be appreciated that the constant values of 0.001 and 0.999 in the last two equations are arbitrary. In essence, these constants are filter values that spread the effect of changes in $VS_K$ and $VO_K$ over a large number of cycles. In this way, the effect of rapid changes in these terms is removed.

As illustrated in FIG. 11, after the related segment of the sensitivity and offset curve is updated (if required), the next major step in the MCHN subroutine is to determine the velocity feedback factor VFBK. As illustrated in FIG. 13C, the first step in this portion of the overall MCHN subroutine is to determine the average acceleration (AM1Q). The value of AM1Q is to be determined in accordance with the equation:

$$AM1Q = \frac{VM1H - VM3H}{\Delta T} \quad (7)$$

The next step is to determine the average requested acceleration (ARM1Q). This value of ARM1Q is determined in accordance with the equation:

$$ARM1Q = \frac{VRM1H - VRM3H}{\Delta T} \quad (8)$$

The next step is to filter the average acceleration (AM1) value in accordance with the equation:

$$AM1 = 0.01 AM1Q + 0.99 PAM1 \quad (9)$$

where PAM1 is the prior value of AM1. The next step is to filter the average requested acceleration (ARM1) value in accordance with the equation:

$$ARM1 = 0.01 ARM1Q + 0.99 PARM1 \quad (10)$$

where PARM1 is the prior value of ARM1. The filter time constants 0.01 and 0.99, of the last two equations are arbitrary. The chosen constants average the calculated values over 100 intervals. If desired, other time constant values can be used, depending upon the desired (or required) smoothing requirements of an actual embodiment of the invention.

The next step illustrated in FIG. 13C is a test to determine whether or not the value of ARM1 is greater or less than AM1. If ARM1 is greater than ARM1 then a feedback velocity correction factor (AFAC) is set equal to 1+X where X is a constant related to the time interval. For example, X could be equal to ΔT/100. Alternatively, other values can be used. If ARM1 is less than AM1, the feedback correction factor AFC is set equal to 1−X where X has the same value as it had in the equation AFAC=1+X. Finally, the feedback velocity correction factor (VFBK) is determined in accordance with the equation VFBK=PVFBK (AFAC), where PVFBK value is the value of VFBK determined during the preceding cycle.

Figure 13D:
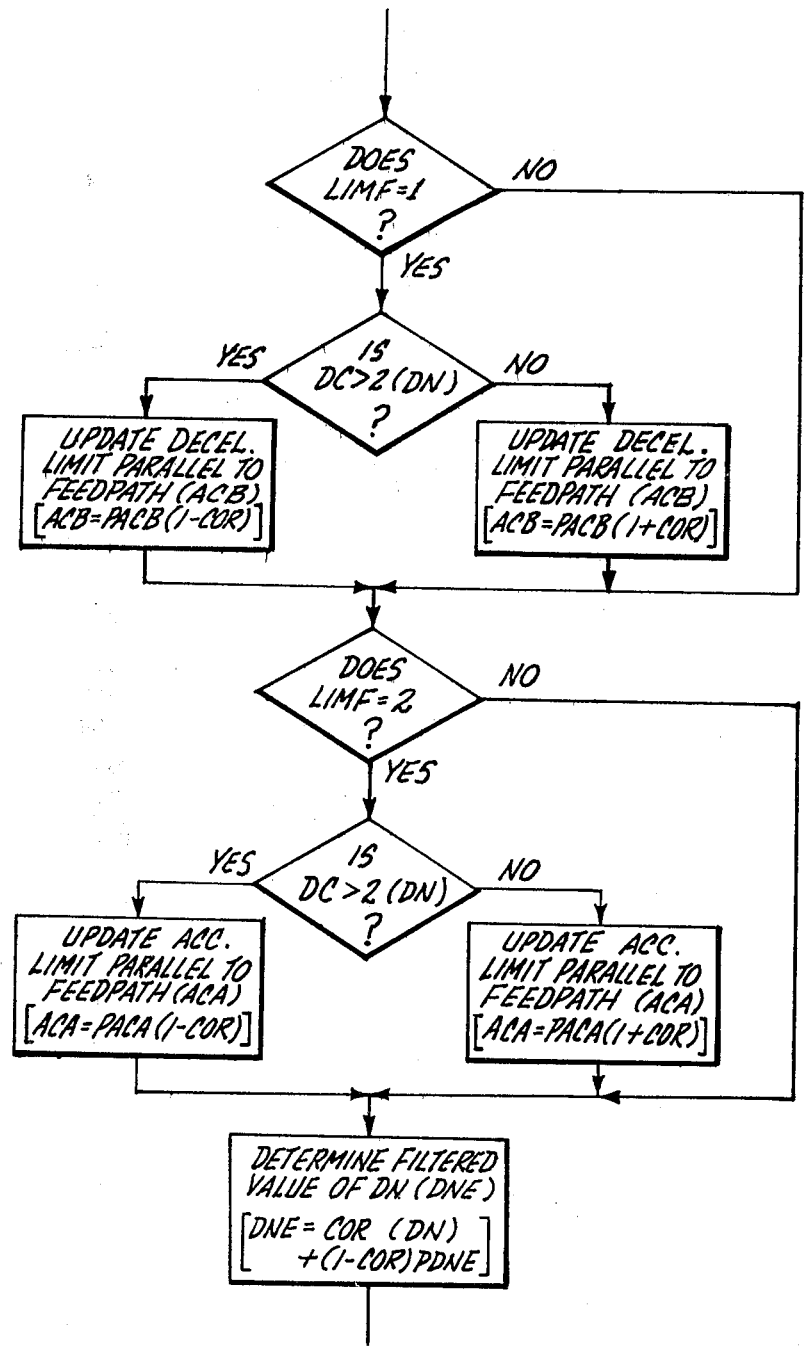
Figure 13E:
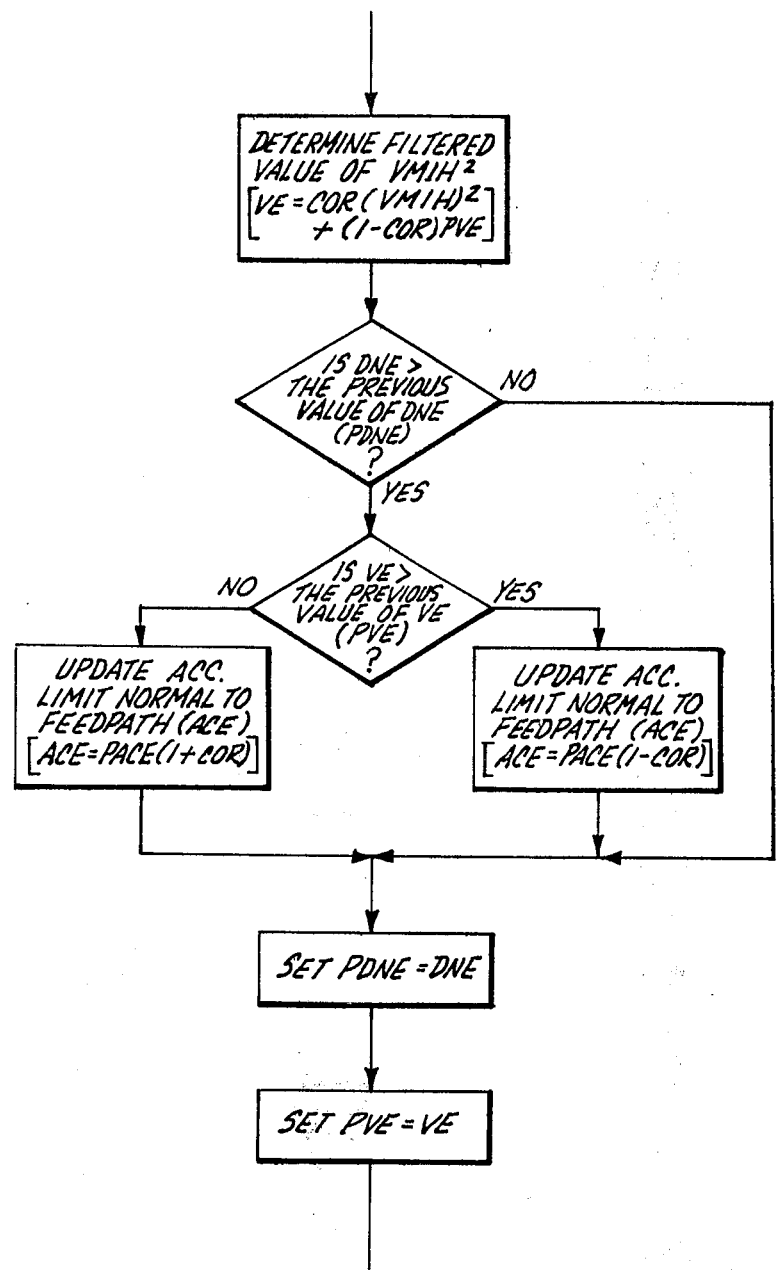

The next portion of the MCHN subroutine is actually bypassed during a pass through the combined GOV and MCHN subroutines (because the hereinafter described LIMF term is at zero). However, it is followed, as required, during a pass through the combined CTL and MCHN subroutines, which combination occurs during the geometry following mode of operation illustrated in FIGS. 15A and B and hereinafter described. While not followed in the combined GOV and MCHN subroutines, because these steps form the next illustrated part of the MCHN subroutine, they are described here. Specifically, as illustrated in FIG. 13D, after the VFBK factor is determined, a test is made to determine whether or not the value of a factor, denoted LIMF is equal to one. (Any value of LIMF other than zero is determined during the CTL subroutine hereinafter described.) If the value of LIMF is equal to one, a test is made to determine whether or not the value of DC (also determined during the CTL subroutine) is greater than twice the value of DN. If the value of DC is greater than twice the value of DN, the deceleration limit parallel to the feedback path (ACB) is updated in accordance with the equation.

$$ACB = PACB(1 - COR) \quad (11)$$

where: PACB is the previous value of ACB and COR is a fixed correction factor equal to ΔT/100, for example. If DC is not greater than twice DN, the deceleration limit parallel to the feedback path (ACB) is also updated. However, in this case ACB is updated in accordance with the equation:

$$ACB = PACB(1 + COR) \quad (12)$$

where PACB and COR are as defined above.

If LIMF is not equal to one, a test is made to determine whether or not LIMF is equal to 2. If LIMF is equal to 2, a test is made to determine whether or not DC is greater than twice DN. If DC is greater than twice DN, the acceleration limit parallel to the feedback path (ACA) is updated in accordance with the equation:

$$ACA = PACA(1 - COR) \tag{13}$$

where PACA is the previous value of ACA and COR is defined above. If DC is not greater than twice DN, the acceleration limit parallel to the feedback is updated in accordance with the equation:

$$ACA = PACA(1 + COR) \tag{14}$$

where PACA and COR are as defined above.

If LIMF is not equal to 1 or 2 (as occurs when the GOV and MCHN subroutines are combined because LIMF is initially set equal to zero and remains at this value), neither the acceleration or deceleration limits parallel to the feedback path (ACA or ACB) are updated. Such updates are unnecessary when the GOV and MCHN subroutines are combined because no movement parallel to the feedpath are required. Regardless of whether or not ACA or ACB are updated or the updating sequence is bypassed, the next step is to determine the filtered value of DN (denoted DNE). The value of DNE is determined in accordance with the equation:

$$DNE = COR(DN) + (1 - COR)PDNE \tag{15}$$

where, preferably, COR has the value noted above; DN has the value determined during the GOV subroutine (or the value determined during the hereinafter described CTL subroutine, whichever is appropriate); and, PDNE is the value of this term determined during a previous cycle or the initial value of DNE.

After the value of DNE has been determined, the filtered value of VM1H$^2$ (denoted VE) is determined in accordance with the equation:

$$VE = COR(VM1H)^2 + (1 - COR)PVE \tag{16}$$

where, preferably, COR has the value noted above; VM1H has the value determined previously during the MCHN subroutine (FIG. 13B); and, PVE is the value VE determined during a previous cycle or the initial value of VE.

The next step is to determine whether or not the value of DNE is greater than PDNE. If the value of DNE is greater than PDNE then a test is made to determine whether or not the value of VE is greater than PVE. If VE is greater than PVE, the acceleration limit normal to the feedback path (ACE) is updated in accordance with the equation:

$$ACE = PACE(1 - COR) \tag{17}$$

If VE is not greater than PVE, the acceleration limit normal to the feedback path (ACE) is updated in accordance with the equation:

$$ACE = PACE(1 + COR) \tag{18}$$

where COR in the last two equations has the value defined above; and, PACE is the value of ACE determined during a previous cycle or the initial value of ACE. Finally, if DNE is not greater than PDNE, the acceleration limit normal to the feedback path is not updated. After the tests and updating of the acceleration limit normal to the feedback path are made, if necessary, PDNE is set equal to DNE and PVE is set equal to VE. At this point, the MCHN subroutine is complete.

As noted above, the combined GOV and MCHN subroutines are entered in the middle of the MCHN subroutine, rather than starting with the sensing of the position of the tool and ending with energizing the drive motors. Because this mid entry may be confusing and because the functional operation of these two subroutines may be more easily understood by reference to a "read-to-drive" diagram, FIG. 14 is included. FIG. 14 is a summary illustration of the combined GOV and MCHN subroutines starting at the read point in the MCHN subroutine and ending at the drive point in the MCHN subroutine. The first step illustrated in FIG. 14 is the reading of the position of the cutter or part, whichever is required along each sense axis, to produce the D$\emptyset\emptyset$ data. Next the D$\emptyset\emptyset$ data is filtered to produce the D$\emptyset$ data. The next steps are determining the measured velocity (VM1H); and, then, updating the related segment of the sensitivity and offset curve. Then the velocity feedback factor (VFBK) is determined. Finally the acceleration limit normal to the cutting centerline is determined.

All of the foregoing steps illustrated in FIG. 14 form part of the MCHN subroutine and relate to updating the machine tool transfer function. After the acceleration limit normal to the cutting centerline is determined, the GOV subroutine is entered. The first step in the GOV subroutine is to determine the correction vector (DX2). Then the displacement compensation velocity (VRP1H) is determined. Then the combined GOV and MCHN subroutines shift back to the MCHN subroutine. The first step after the return to the MCHN subroutine is to add the velocity compensation (which is based on the feedback factor) to the displacement compensation velocity. Then, the result is indexed to the correct segment of the sensitivity and offset curve and the velocity value is changed to counts. The counts are then used to control the powering of the drive motors. Hence, as noted above, the GOV and beginning portion of the MCHN subroutine (shown as the latter portion in FIG. 14) use the transfer function information to control the production of motor drive control pulses.

Figure 15A:
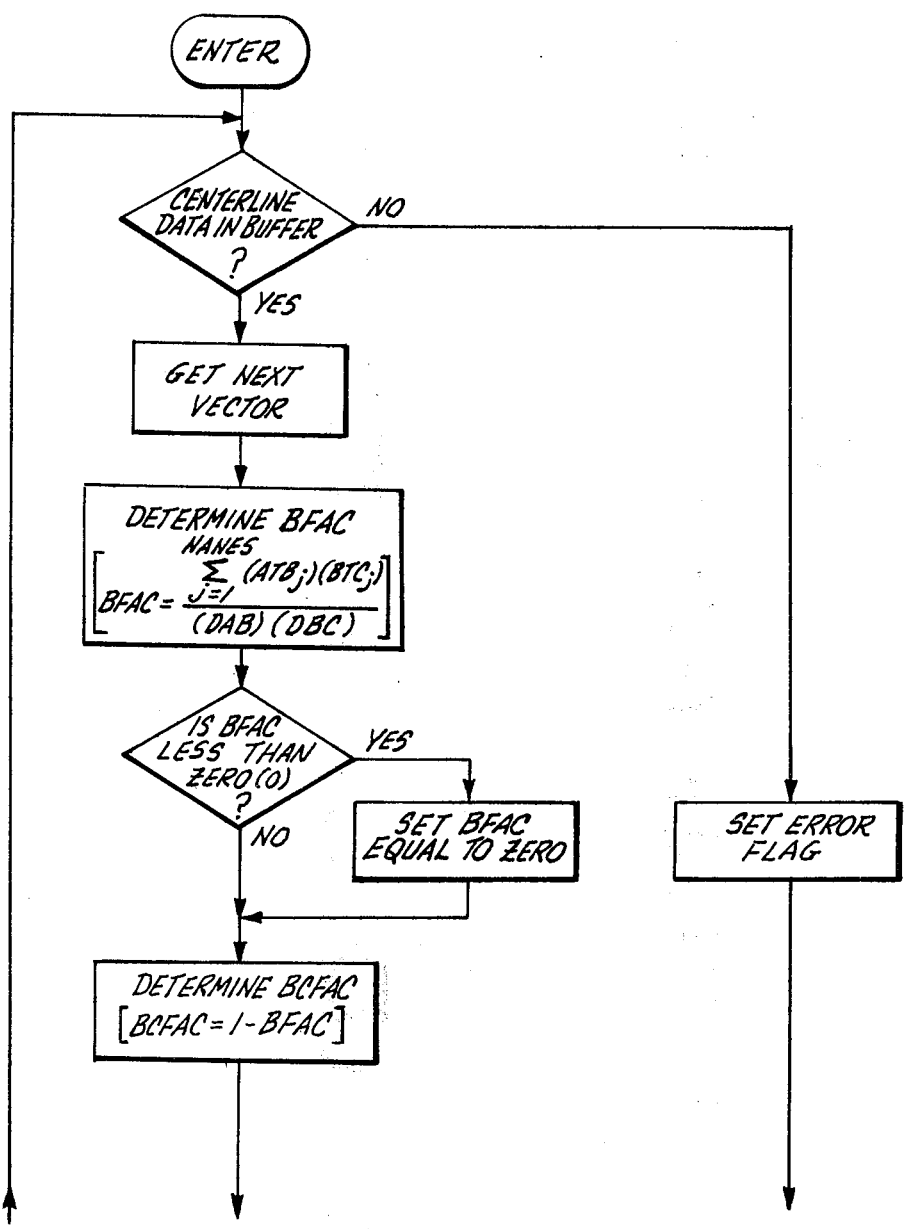
FIG. 15A and B comprise a flow diagram illustrating the geometry following mode of operation illustrated in FIG. 6.
Figure 15B:
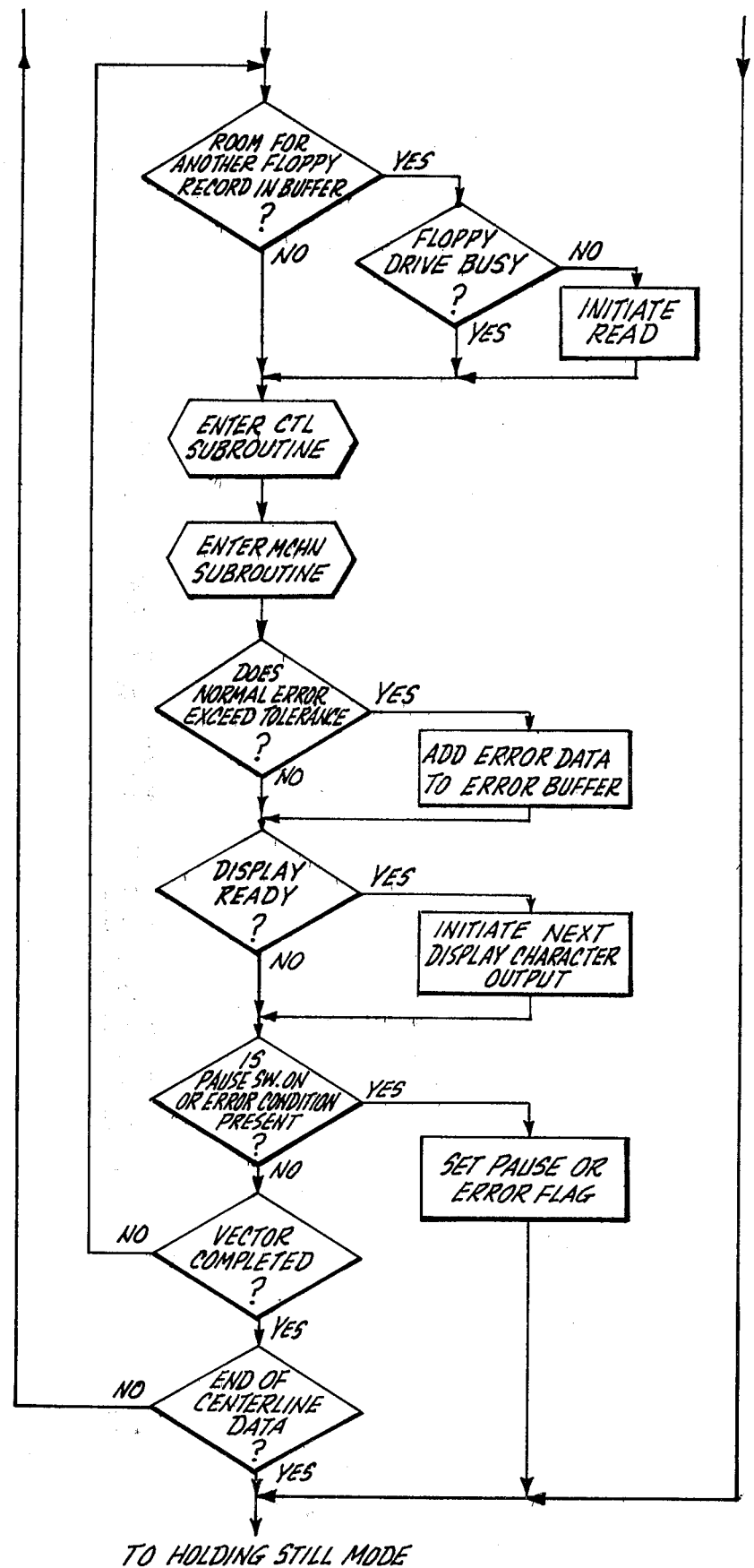

FIGS. 15A-B comprise a flow diagraph of the geometry following mode of operation of the invention. As previously noted, the automatic control system enters the geometry mode of operation in accordance with the operator's instructions when it is desired to cut a part in accordance with a particular numerical control program. The first step in the geometry following mode of operation is to determine whether or not centerline data is in the buffer memory. If no centerline data is in the buffer memory, an error flag is set and the system cycles to the holding still mode of operation; and the error flag causes a suitable display to be initiated.

If there is centerline data in the buffer memory, the next vector data is read. Then, the value of a term denoted BFAC is determined in accordance with the following equation:

$$BFAC = \frac{\sum_{j=1}^{NAXES} (ATB_j)(BTC_j)}{(DAB)(DBC)} \quad (19)$$

As will be understood from the following description of the CTL subroutine, BFAC is used to determine the minimum feed rate change that can occur by the end of a vector time interval (ΔT) without loss of the ability to turn from the present vector (ATB) to the next vector (BTC) without an out of tolerance overshoot. After the value of BFAC is determined, a test is made to determine whether or not the value of BFAC is less than zero. If less than zero, i.e., if BFAC is negative, BFAC is set equal to zero. If BFAC is not less than zero, or after BFAC has been set equal to zero, the value of a term denoted BCFAC is determined by subtracting the value of BFAC from one(1). BCFAC is also used during the CTL subroutine to determine the minimum feedrate change that can occur by the end of a vector time interval (ΔT) without loss of the ability to turn from the present vector to the next vector without an out of tolerance overshoot.

After the value of BCFAC has been determined, a test is made to determine whether or not there is room in the buffer memory for another floppy record. If so, a test is made to determine whether or not the floppy drive is busy. If the floppy drive is not busy, the next portion of the centerline data is read into the buffer memory. After the data is read in or if the floppy drive is busy, or if there is no room for another floppy record in the buffer memory, the CTL subroutine is entered. After the CTL subroutine (which is hereinafter described) is completed, the MCHN subroutine is entered. After the MCHN subroutine is completed, a test is made to determine whether or not any error normal to the centerline that exceeds the allowable tolerance has been determined. This determination is essentially made during the pass through the CTL subroutine when the value of DN is determined. If the $\sqrt{DN}$ is greater than the allowable tolerance a recordable error exists. The amount of the error and its position (determined by the cutter position at the time the error is detected) forms error data. If error data is determined, it is added to the error buffer. After the error data has been added, or if no error data is present, a test is made to determine whether or not the display is ready to receive the next character. If the display is ready to receive the next character, a subroutine causing the next display character to be outputed is initiated. After the next display character has been outputed, or if the display is not ready for another character, a test is make to determine whether or not a pause switch (one of the control panel switches) is on or an error condition exists. If the pause switch is on or an error condition is present, the pause or error flag is set and the geometry following mode cycles to the holding still mode of operation. If the pause switch is not on and no error condition is present, a test is made to determine whether or not the vector is completed. If the vector is not completed, the geometry following mode of operation cycles back to the point where a test is made to determine whether or not there is room for another floppy record in the buffer memory. Thereafter, the intervening steps of the geometry following mode of operation are repeated. If the vector is complete, a test is made to determine whether or not the end of the centerline data has been reached. If not, the geometry following mode of operation cycles back to the point where a test is made to determine whether or not there is centerline data in the buffer memory and the intervening steps of the geometry following mode of operation are repeated. If the end of the centerline data has been reached, the geometry following mode of operation cycles to the holding still mode of operation previously described.

Figure 17A:
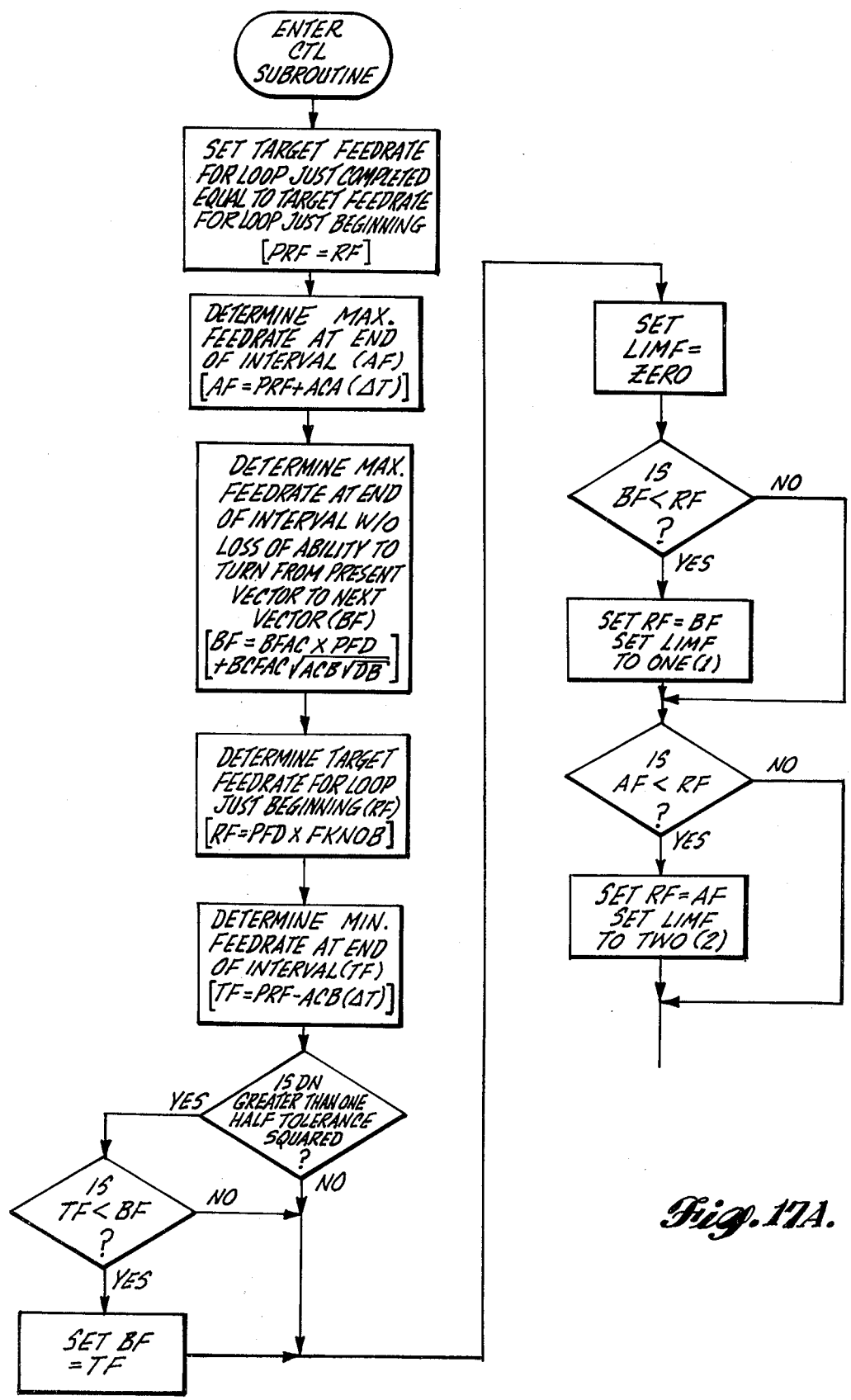
FIG. 17 A-C comprise a detailed flow diagram of the CTL subroutine summarized in FIG. 16; and, FIG. 18 is a read-to-move flow diagram of a pass through the combined CTL and MCHN subroutines.
Figure 17B:
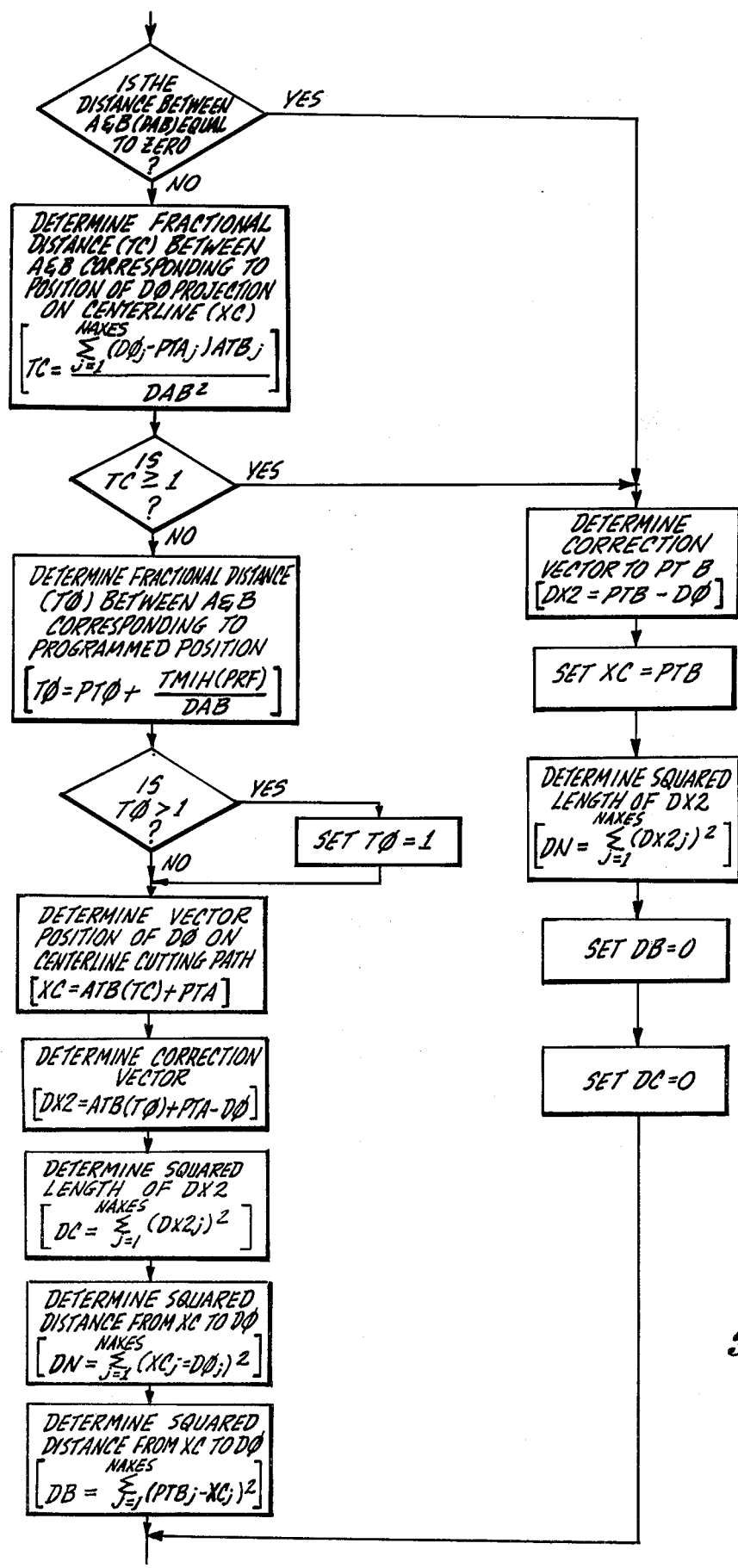
Figure 17C:
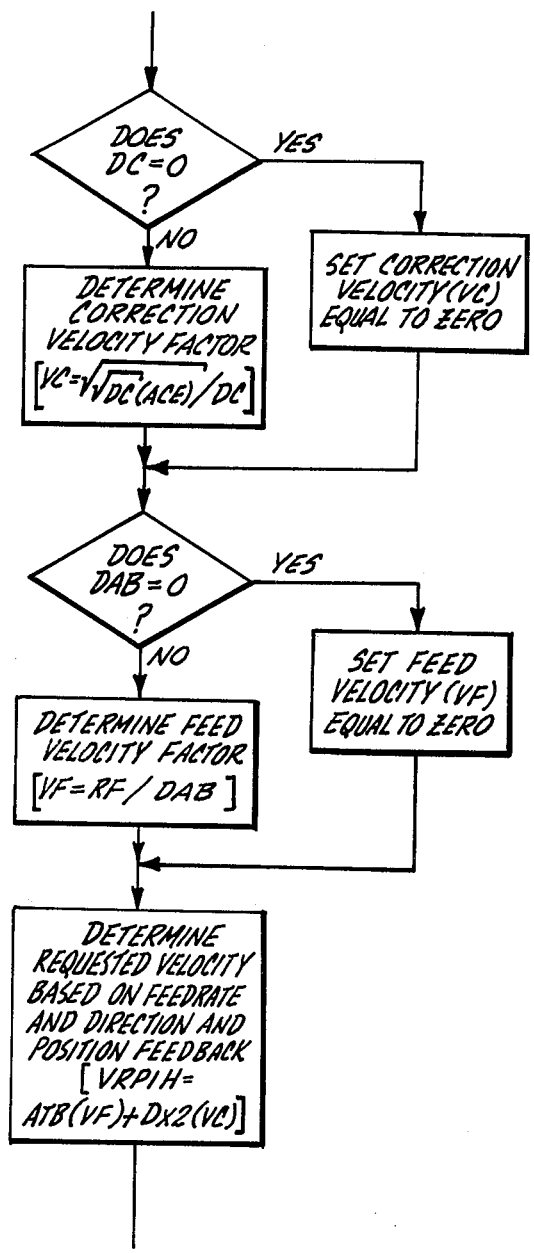

As noted above, during the geometry following mode of operation, the CTL subroutine is combined with the MCHN subroutine, rather than the GOV subroutine being combined with the MCHN subroutine. The CTL subroutine is summarized in FIG. 16. A detailed diagram of the preferred implementation of the CTL subroutine is illustrated in FIGS. 17A-C. Referring first to FIG. 16, the CTL subroutine starts with the step of setting the target feed rate for the loop just completed equal to the target feed rate for the loop just beginning. In other words, target feed rate history is updated. Then, a determination of feed rate limits is made. Specifically, there are determinable limits to the feed rate that can exist during and at the end of each particular vector. The feed rate may be limited by the physical limits of the machine, such as the maximum acceleration parallel to the feed path, normal to the feed path, etc. Alternatively, the feed rate may be based on the minimum feed rate change that can occur by the end of an interval without loss of the ability to turn without overshoot. In any event, the various feed rate limits (which are hereinafter described with respect to FIG. 17A) are determined. Then, a decision is made as to which of the feed rate limits should be the controlling limit; and, the target feed rate is set equal to this feed rate value.

The next main step in the CTL subroutine is to determine whether or not the distance from point A to point B (DAB) is equal to zero. If DAB is not equal to zero, the fraction of DAB related to the projection of the error vector onto the cutting centerline is determined. Next, whether or not this fraction is greater than one is determined. If the fraction is not greater than one, the fraction of DAB related to the programmed position is determined. Then, whether this fraction is greater than one is determined. If it is greater than one, it is set equal to one. If it is not greater than one, the magnitude and direction of the error vector is determined. Then, a determination of the distance to point B is made.

If DAB is equal to zero or the fraction of DAB related to the projection of the error vector is greater than one, a determination of the distance to point B is also made. After the determination of the distance to point B is made, regardless of the path followed, the error correction velocity is combined with the program velocity. Then, the MCHN subroutine is entered.

As illustrated in the detailed flow diagram of the CTL subroutine, which starts with FIG. 17A, the first step is to set the target feed rate for the loop just completed (PRF) equal to the target feed rate for the loop just beginning (RF). In other words, the value of PRF is updated to the value of the feed rate for the loop just beginning. The next step is to determine the maximum feed rate that can occur at the end of interval (AF). In essence, AF is equal to the value of the previous feed rate increased by an amount equal to the maximum acceleration times the interval over which the acceleration occurs (ΔT). In other words, AF is determined in accordance with the equation:

$$AF = PRF + ACA(\Delta T) \quad (20)$$

where, as noted in Table I, ACA is equal to the acceleration limit parallel to the feed path.

The next step in the CTL subroutine is to determine the maximum feed rate that can exist at the end of the present interval without loss of the ability to turn from the present vector to the next vector. The value of this term, denoted BF, is determined in accordance with the equation:

$$BF = BFAC(PFD) + BCFAC\sqrt{ACB}\sqrt{DB} \qquad (21)$$

The values of BFAC and BCFAC are determined during the geometry following mode of operation, prior to the entry into the CTL subroutine, as discussed above during the description of FIG. 15A.

The next step in the CTL subroutine is to determine the target feed rate for the loop just beginning (RF). The target feed rate is operator controlled by adjusting a knob on the control panel, with the knob setting being denoted FKNOB. Thus, RF is determined in accordance with the equation:

$$RF = PFD(FKNOB) \qquad (22)$$

where, as noted in Table I, PFD is the programmed feed rate.

The next step is to determine the minimum feed rate at the end of the interval. The minimum feed rate, denoted TF, is determined by the maximum deceleration that can occur during a vector interval ($\Delta T$). Thus, TF is determined in accordance with the equation:

$$TF = PRF - ACB(\Delta T) \qquad (23)$$

The next sequence of steps in the CTL subroutine determines which of the foregoing feed rates should be the controlling feed rate. The first step in this sequence is a test to determine whether the value of DN is greater than one-half the acceptable tolerance squared. In other words, this step of the CTL subroutine determines whether the perpendicular distance between the position of the cutter with respect to the centerline is greater than one-half the allowable tolerance squared. If so, a test is made to determine whether or not the value of TF is less than the value of BF. If the value of TF (i.e., the minimum feed rate at the end of the interval, based on maximum deceleration) is less than BF (i.e., the maximum feed rate that can exist at the end of the interval without loss of the ability to turn from the present vector to the next vector), then BF is set equal to TF. If DN is not greater than one-half the tolerance squared, TF is not less than BF or if TF is less the BF and BF has been set equal to the value of TF, LIMF is set equal to zero. Then a test is made to determine whether or not BF is less than RF (i.e., the target feed rate for the loop just completed). If BF is less than RF, RF is set equal to BF and LIMF is set equal to one. If BF is not less than RF, or if BF is less than RF and RF has been set equal to BF, a test is made to determine whether or not the value of AF is less than RF. If AF is less than RF, RF is set equal to AF and LIMF is set equal to two. If AF is not less than RF, or if AF is less than RF and RF has been set equal to AF, a test is made (FIG. 17B) to determine whether the distance between A and B (DAB) is equal to zero. If DAB is not equal to zero, the fractional distance (TC), between A and B corresponding to the position (XC) of the projection of D∅ on the centerline is determined. TC is determined in accordance with the equation:

$$TC = \frac{\sum_{j=1}^{NAXES}(D\emptyset_j - PTA_j)(ATB_j)}{(DAB)^2} \qquad (24)$$

Next, a test is made to determine whether or not the value of TC is greater than or equal to one. If TC is not greater than or equal to one, i.e., TC is less than one, the fractional distance (T∅) between A and B corresponding to the programmed position is determined in accordance with the equation:

$$T\emptyset = PT\emptyset + \frac{TM1H(PRF)}{DAB} \qquad (25)$$

where PT∅ is the previous value of T∅.

Next a test is made to determine whether or not the new value of T∅ is greater than one. If the new value of T∅ is greater than one, T∅ is set equal to one. After T∅ is set equal to one, or if T∅ is not greater than one, the vector position of D∅ on the centerline cutting path (XC) is determined in accordance with the equation:

$$XC = ATB(TC) + PTA \qquad (26)$$

Next, the correction vector (DX2) is determined in accordance with the equation:

$$DX2 = ATB(T\emptyset) + PTA - D\emptyset \qquad (27)$$

Then the squared length of DX2 is determined. The squared length of DX2 is identified by the term DC and is determined in accordance with the equation:

$$DC = \sum_{j=1}^{NAXES}(DX2_j)^2 \qquad (28)$$

The next step is to determine the squared distance from XC to D∅. This distance (DN) is determined in accordance with the following equation:

$$DN = \sum_{j=1}^{NAXES}(XC_j - D\emptyset_j)^2 \qquad (29)$$

Finally, the squared distance from XC to point B, identified by the term DB, is determined in accordance with the following equation:

$$DB = \sum_{j=1}^{NAXES}(PTB_j - XC_j)^2 \qquad (30)$$

Turning now to the right side of FIG. 17B, if DAB is equal to zero or if TC is greater than or equal to one, the correction vector to point B is determined in accordance with the equation:

$$DX2 = PTB - D\emptyset \qquad (31)$$

Then, XC is set equal to PTB. Thereafter, the squared length of DX2 (DN) is determined in accordance with the following equation:

$$DN = \sum_{j=1}^{NAXES} (DX2_j)^2 \qquad (32)$$

Finally, DB is set equal to zero and, then, DC is set equal to zero.

After the values of DX2, XC, DN, DB and DC are determined or set in accordance with the foregoing steps, a test (FIG. 17C) is made to determine whether or not DC is equal to zero. If DC is not equal to zero, the correction velocity factor, (VC) is determined in accordance with the following equation:

$$VC = \frac{\sqrt{\sqrt{DC} \; (ACE)}}{DC} \qquad (33)$$

If DC is equal to zero, the correction velocity (VC) is set equal to zero. After the correction velocity is determined or set, a test is made to determine whether the distance between A and B (DAB) is equal to zero. If this distance is not equal to zero, a feedback velocity factor (VF) is determined in accordance with the following equation:

$$VF = RF/DAB \qquad (34)$$

If DAB is equal to zero, the feed velocity factor (VF) is set equal to zero.

The final step in the CTL subroutine is to determine the requested velocity based on feed rate and direction and position feedback. This value, identified by the term VRP1H, is determined in accordance with the following equation:

$$VRP1H = ATB(VF) + DX2(VC) \qquad (35)$$

After the value of VRP1H has been determined, the CTL subroutine ends and the MCHN subroutine is entered.

Figure 18:
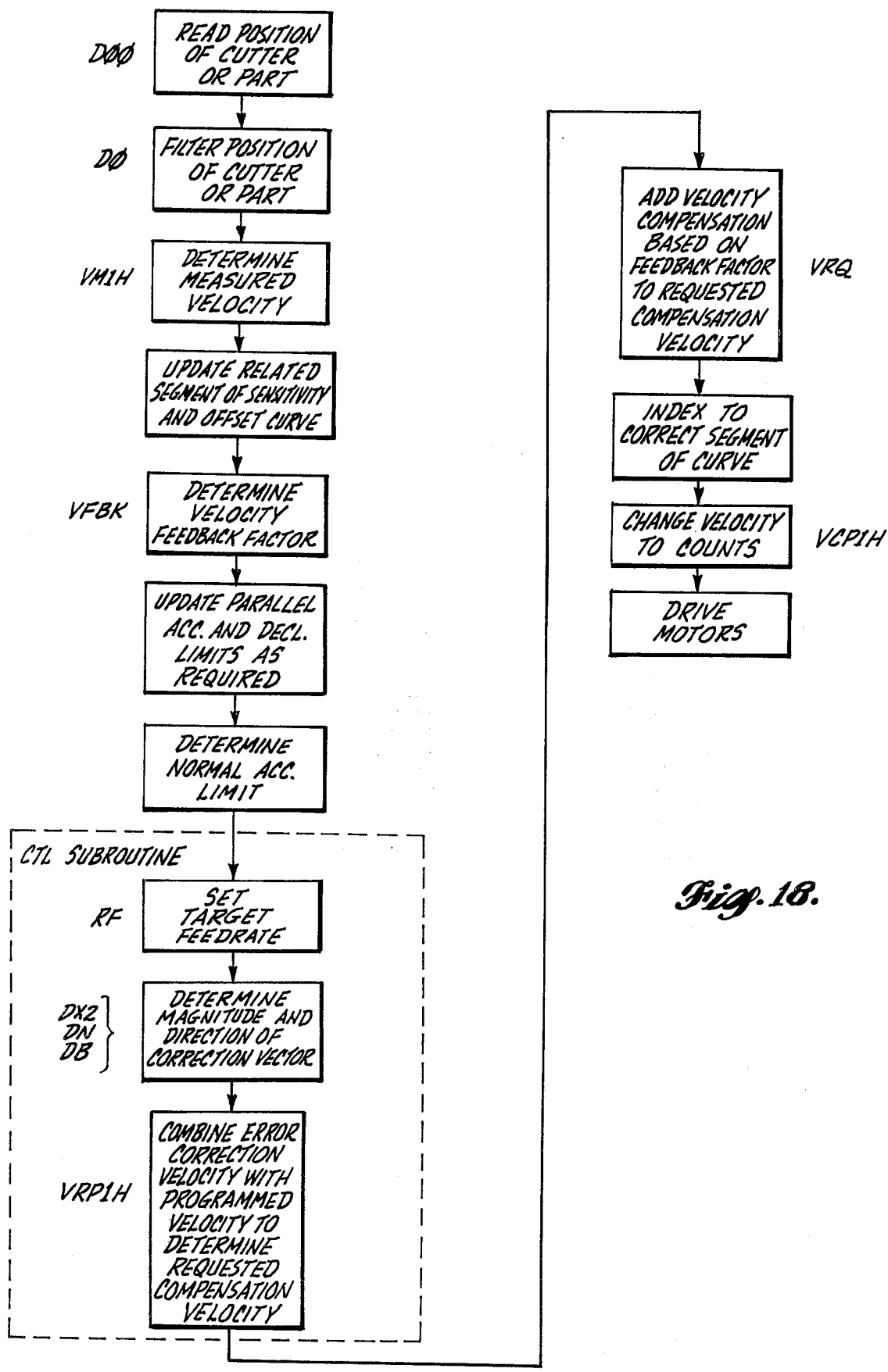

FIG. 18 is a flow diagram illustrating the combined CTL and MCHN subroutines. Rather than starting with the CTL subroutine and continuing through the MCHN subroutine, as occurs in the preferred embodiment of the invention, FIG. 18 is a combined summary flow diagram that starts with the reading of the position of the cutter (or the part) and ends with the application of power to the drive motors that control the position of the cutter (or the part). It is believed that this type of illustration will make the operation of these two combined subroutines more easily understood.

The first functional step that occurs in the illustrated CTL and MCHN subroutines is the reading of the position sensors that sense the position of the cutter and/or the part along the movement axes to develop the DØØ information. The next step is to filter the DØØ information in a recursive filter to eliminate undesirable high frequency components. The resultant information, identified as the DØ information, is then used to determine the measured velocity of movement along the axis of movement, i.e., the VM1H information. The VM1H information is then utilized to update the related segment of the sensitivity and offset curve. Next, the velocity feedback factor, VFBK, is determined. Then the parallel acceleration limits are updated and the acceleration limit normal to the cutting centerline is determined. At this point the MCHN subroutine ends, since the transfer function has been updated, and the CTL subroutine begins. The first step in the CTL subroutine is to set the target feedrate, RF. Then, the magnitude and direction of the correction vector and various components thereof (DX2, DN and DB) are determined. Then, the error correction velocity is combined with the programmed velocity to determine the requested compensation velocity (VRP1H). At this point the CTL subroutine ends and the MCHN subroutine is again entered. The first major functional step of the MCHN subroutine is to add the velocity compensation based on the feedback factor to the requested velocity compensation to obtain the value of VRQ. The VRQ value is then indexed to the correct segment of the sensitivity and offset curve and changed to counts, which are denoted VCP1H, as described above. The VCP1H counts value is then utilized to control the energization of the motors that control cutter and/or part movement along the various axes. As a result, the transfer function data is used with program or control signal data to control part and/or cutter movement.

As it will be readily appreciated from the foregoing description of a preferred embodiment, the invention provides a new and improved machine tool controller that eliminates many of the prior art problems of controllers adapted to numerically control the operation of machine tools. More specifically, because the present invention continuously determines the transfer function of the machine tool and uses the transfer function information in combination with centerline defining data, the cutting speed of the machine tool can be optimized while maintaining the cutting path within prescribed tolerances. Further, the continuous determination of the transfer function allows the machine tool controller to automatically compensate for machine tool wear so as to substantially reduce the need to frequently adjust the machine tool or replace parts thereof to compensate for wear. Moreover, because deviations from the centerline of the cutting path over and above a predetermined tolerance are detected and stored, this information is available for readout whereby post processing inspection is substantially reduced or entirely eliminated using the invention.

While a preferred embodiment of the invention has been illustrated and described, it would be appreciated that various changes can be made therein without departing from the spirit and scope of the invention. For example, in many of the described subroutines the order of determination of the value of certain terms can be changed, if desired. Moreover, as noted above, other machine tool position controllable axes can be controlled utilizing a machine tool controller formed in accordance with the invention, including rotational, as well as linear, control axes. Further, machine tools other than milling machines of the type illustrated in FIG. 2 can be controlled by machine tool controller and part inspection monitors formed in accordance with the invention. Consequently, the invention can be practiced otherwise than as specifically described herein.

The embodiments of the invention in which an exclusive property or privilege is claimed are defined as follows:

1. A machine tool controller and part inspection monitor for controlling the cutting of parts by a machine tool and producing a readout denoting deviations of the actual cutting path from the desired path beyond a predetermined tolerance, said machine tool controller and part inspection monitor comprising:

(A) position sensors for continuously sensing the relative position of a part to be cut and a cutter along predetermined axes and continuously producing axes position signals related thereto;

(B) centerline signal producing means for producing centerline signals that define the centerline of the cutting path of travel to be followed by said cutter as a part is being cut;

(C) positioning means for controlling the relative position of said part and said cutter in response to position command signals; and, (D) data processing means coupled to said position sensors, said centerline signal producing means and said positioning means for:

(1) receiving said axes position signal;
(2) receiving said centerline signals;
(3) continuously determining the transfer function of said machine tool;
(4) using said continuously determined transfer function and said centerling signals to produce position command signals adapted to cause said relative position of said cutter and said part to follow the centerline of the cutting path of travel defined by said centerline signals;
(5) applying said position command signals to said positioning means for controlling the operation of said positioning means such that the relative position of said cutter and said part follow the centerline of the cutting path of travel defined by said centerline signals; and,
(6) determining when the relative position of said cutter and said part deviates from said centerline of the cutting path of travel defined by said centerline signals beyond a predetermined amount and storing for readout data related to said deviations.

2. A machine tool controller and part inspection monitor as claimed in claim 1 wherein said centerline of the cutting path of travel is defined by a series of vectors.

3. A machine tool controller and part inspection monitor as claimed in claim 2 wherein said data processing means includes a holding still mode of operation during which said centerline signals define a cut starting position and said position command signals are adapted to maintain the relative position of said cutter and said part at said cut starting position.

4. A machine tool controller and part inspection monitor as claimed in claim 3 wherein said holding still mode of operation includes:

(A) a GOV subroutine for:
(1) determining a correction vector running from the actual relative position of said part and said cutter, as defined by said axis position signals, to the cut starting position, as defined by said centerline signals; and,
(2) determining displacement compensation velocity based on said correction vector and the acceleration limit of the machine tool being controlled normal to the centerline of the cutting path of travel defined by said centerline signals; and, (B) a MCHN subroutine for:
(1) determining velocity compensation based on a previously developed feedback factor;
(2) summing said velocity compensation with said displacement compensation velocity; and,
(3) utilizing said sum of said velocity compensation and said displacement compensation to control said position command signals.

5. A machine tool controller and part inspection monitor as claimed in claim 4 wherein said MCHN subroutine utilizes said sum of said velocity compensation and said displacement compensation to control said position command signals by indexing said sum to the appropriate segment of a previously determined sensitivity and offset curve, which converts said sum into count signals, said count signals forming said position command signals.

6. A machine tool controller and part inspection monitor as claimed in claim 5 wherein the MCHN subroutine determines said transfer function of said machine tool by:

filtering the axes position signals produced by said position sensors to remove high frequency components therefrom;
determining measured velocity based on sequential axes position signals;
updating a related segment of said sensitivity and offset curve in accordance with said measured velocity;
determining a new velocity feedback factor based on said filtered axes position signals; and,
determining the acceleration limit normal to the centerline of said cutting path of travel defined by said centerline signals.

7. A machine tool controller and part inspection monitor as claimed in claim 3 wherein said data processing means includes a geometry following mode of operation during which said centerline signals define a path of travel along which said cutter is to move and said position command signals are adapted to cause the relative position of said cutter and said part to follow said path of travel.

8. A machine tool controller and part inspection monitor as claimed in claim 7 wherein said geometry following mode of operation includes:

(A) a CTL subroutine for:
(1) setting a target feedrate;
(2) determining a correction vector running from the actual relative position of said part and said cutter, as defined by said axes position signals, to a point on said centerline defined by said centerline signals; and,
(3) determining displacement compensation velocity based on said correction vector and said target feedrate; and, (B) a MCHN subroutine for:
(1) determining velocity compensation based on a previously developed feedback factor;
(2) summing said velocity compensation with said displacement compensation velocity; and,
(3) utilizing said sum of said velocity compensation and said displacement compensation to control said position command signals.

9. A machine tool controller and part inspection monitor as claimed in claim 8 wherein said MCHN subroutine utilizes said sum of said velocity compensation and said displacement compensation to control said position command signals by indexing said sum to the appropriate segment of a previously determined sensitivity and offset curve, which converts said sum into count signals, said count signals forming said position command signals.

10. A machine tool controller and part inspection monitor as claimed in claim 9 wherein said MCHN subroutine determines said transfer function of said machine tool by:

filtering the axes position signals produced by said position sensors to remove high frequency components therefrom;
determining measured velocity based on sequential axes position signals;
updating a related segment of said sensitivity and offset curve in accordance with said measured velocity;
determining a new velocity feedback factor based on said filtered axes position signals;
updating acceleration and deceleration limits parallel to the centerline of said cutting path of travel; and,
determining the acceleration limit normal to the centerline of said cutting path of travel defined by said centerline signals.

11. In a machine tool controller for controlling a machine tool such that the relative position of a part to be machined and a cutter for machining said part follow a predetermined path, the improvement comprising:
position sensors for continuously determining the relative position of the part to be machined and the cutter along predetermined axes and continuously producing axes position signals related thereto; and,
data processing means connected to said position sensors for: (a) receiving said continuously produced axes position signals; (b) continuously determining the transfer function of said machine tool based on the information contained in said continuously produced axes position signals; and, (c) utilizing said transfer function information to control the production of position command signals adapted to control said machine tool such that said cutter follows said predetermined path of travel.

12. The improvement claimed in claim 11 wherein said transfer function of said machine tool is determined by:
filtering the axes position signals produced by said position sensors to remove high frequency components therefrom;
determining measured velocity based on sequential axes position signals;
updating a related segment of a previously determined sensitivity and offset curve in accordance with said measured velocity;
determining a new velocity feedback factor based on said filtered axes position signals; and,
determining the acceleration limit normal to the centerline of said cutting path of travel defined by said centerline signals.

13. The improvement claimed in claim 11 wherein said transfer function of said machine tool is determined by:
filtering the axes position signals produced by said position sensors to remove high frequency components therefrom;
determining measured velocity based on sequential axes position signals;
updating a related segment of a previously determined sensitivity and offset curve in accordance with said measured velocity;
determining a new velocity feedback factor based on said filtered axes position signals;
updating acceleration and deceleration limits parallel to the centerline of said cutting path of travel; and,
determining the acceleration limit normal to the centerline of said cutting path of travel defined by said centerline signals.

* * * * *